United States Patent

Wakabayashi et al.

[11] Patent Number: 5,903,706
[45] Date of Patent: May 11, 1999

[54] IMAGER APPARATUS WITH ROTATABLE CAMERA HEAD

[75] Inventors: Manabu Wakabayashi; Iwao Aizawa, both of Yokohama, Japan

[73] Assignee: Hitachi, Ltd., Tokyo, Japan

[21] Appl. No.: 08/517,925

[22] Filed: Aug. 22, 1995

[30] Foreign Application Priority Data

Aug. 26, 1994 [JP] Japan .................................. 6-201747

[51] Int. Cl.[6] .............................. H04N 5/76; H04N 5/225
[52] U.S. Cl. ........................................... 386/117; 386/107
[58] Field of Search ............................. 386/46, 117, 118, 386/107; 358/906, 909.1; 348/222; H04N 5/76, 5/225

[56] References Cited

U.S. PATENT DOCUMENTS

| | | | |
|---|---|---|---|
| 4,959,729 | 9/1990 | Fukuda et al. | 386/118 |
| 5,442,453 | 8/1995 | Takagi et al. | 358/906 |

FOREIGN PATENT DOCUMENTS

| | | |
|---|---|---|
| 1292321 | 11/1989 | Japan . |
| B46154 | 2/1992 | Japan . |
| 695212 | 4/1994 | Japan . |
| 698210 | 4/1994 | Japan . |
| 724854 | 6/1995 | Japan . |

OTHER PUBLICATIONS

"Color Liquid Crystal Display", Edited by S. Kabyashi; Pub. by Sangyo Tosho Kabushiki Kaisha, pp. 162–163, Dec. 1990.

"High Image Quality MS Movie VL–HL1" by Etsuo Hoshikawa et al., Sharp Technical Report vol. 54 No. 11, pp. 67–70.

"Newton Message Pad" published by Apple Computer, USA, Nov. 1993.

*Primary Examiner*—Robert Chevalier
*Attorney, Agent, or Firm*—Antonelli, Terry, Stout & Kraus, LLP

[57] ABSTRACT

An upside-down image, generated when a video camera is rotated about a horizontal axis to face to substantially the same direction as a display unit does, is electrically corrected to be an upright image. A video camera unit made compact to realize a reduction in weight of a video camera rotating mechanism. An image arrangement convertor circuit is provided between the video camera unit and a liquid crystal display serving as a display unit or a recording unit. A switch is provided in a housing for detecting an angular position of the video camera unit. The video camera, which has an imager device and a lens, is pivoted on an edge of the housing for rotation about an axis parallel to the edge. The image arrangement convertor circuit is operated unitarily in accordance with an angular position of the video camera to automatically correct an upside-down image to an upright image. Since the video camera unit is composed of minimally necessary parts and is rotatably pivoted on an edge of the housing, a rotatable joining portion of the video camera unit with the housing can be reduced in size and weight. This structure also allows the user to adjust the angle of the video camera unit only with the thumb and index finger.

26 Claims, 19 Drawing Sheets

F I G. 12
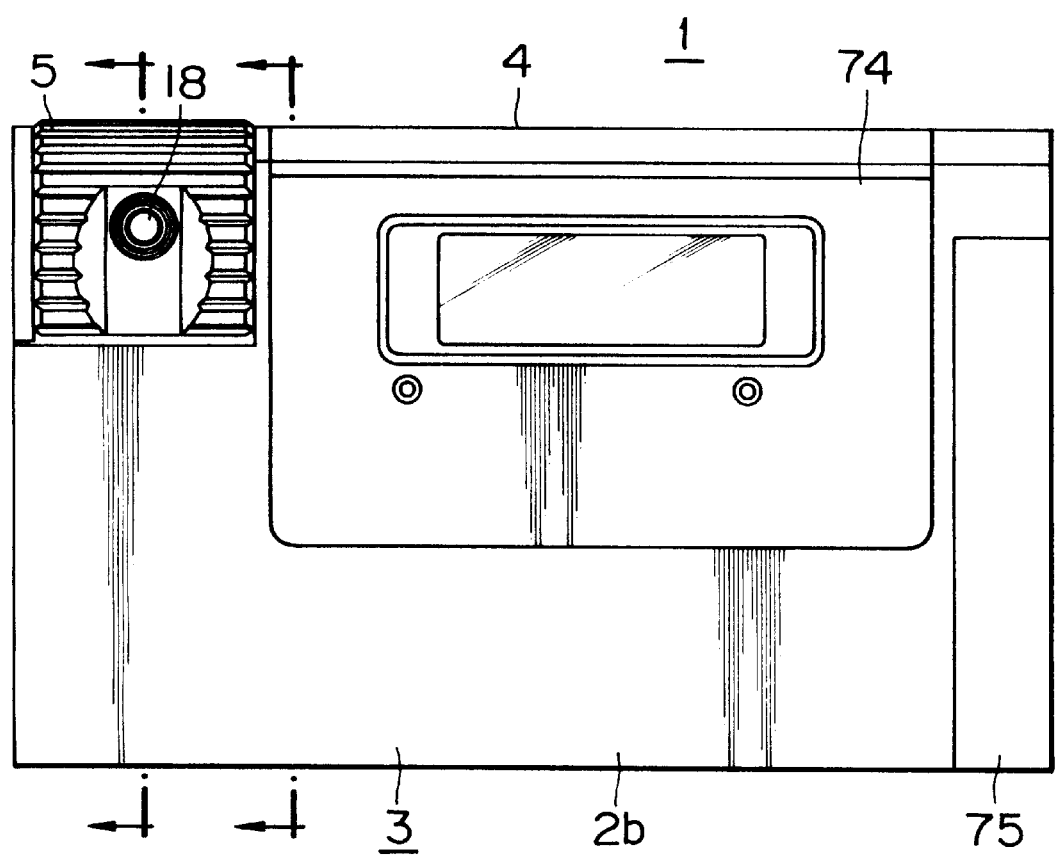

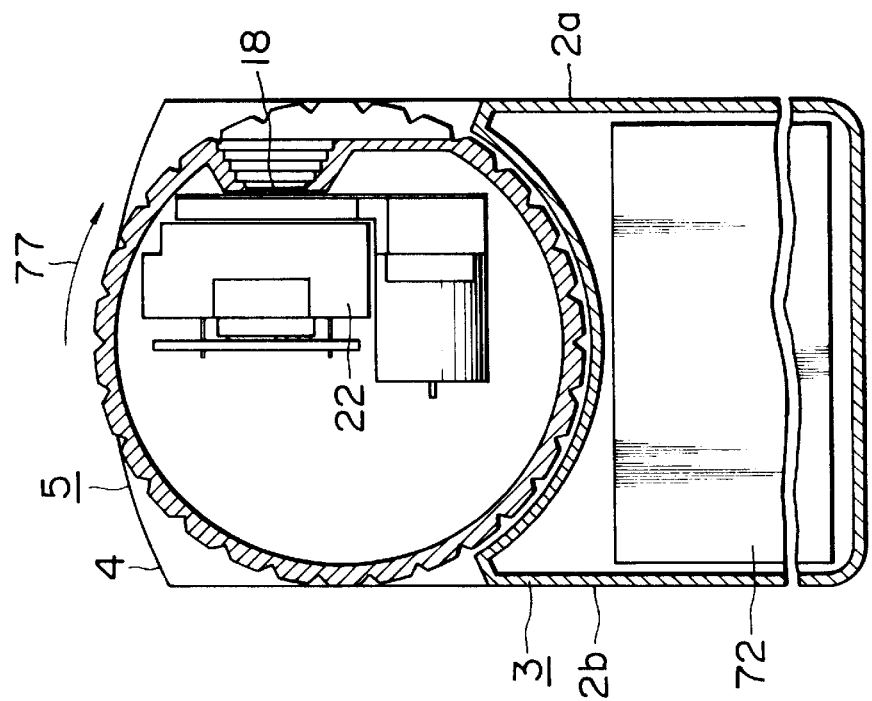
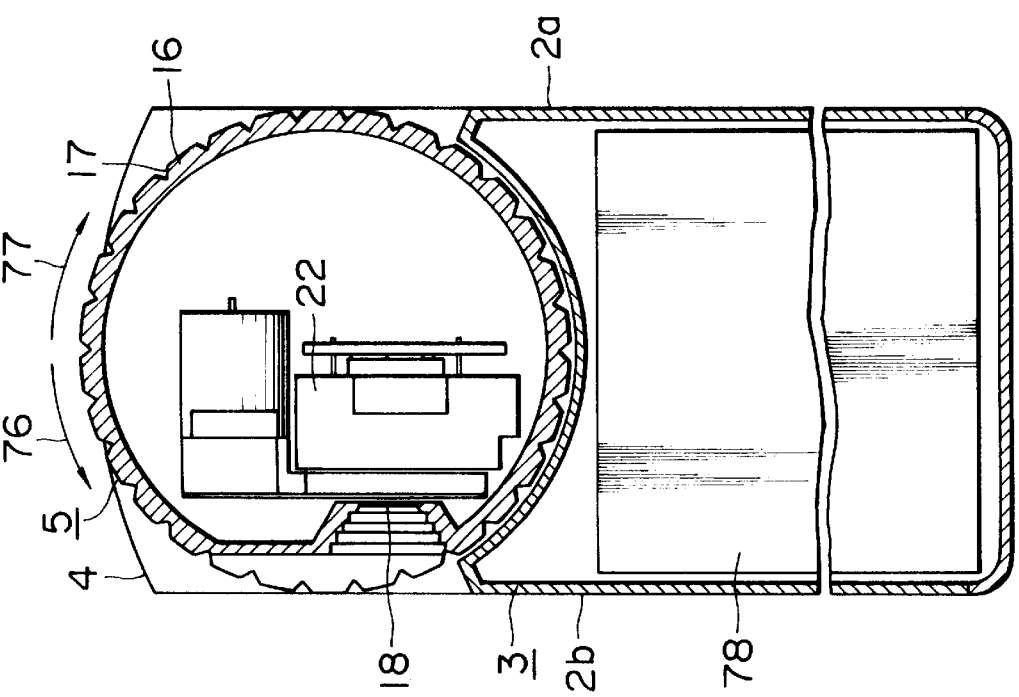

IMAGER APPARATUS WITH ROTATABLE CAMERA HEAD

BACKGROUND OF THE INVENTION

The present invention relates to a portable imager apparatus which includes a video camera as an imager unit, a direct-view type flat display as an electronic view finder or display, and a semiconductor memory or video tape recorder (VTR) as a storage or recording unit, wherein the video camera, the flat display, and the recording unit are integrated with each other, and more particularly to an imager apparatus which allows a user to monitor an image on a flat display to adjust the angle of the video camera apparatus while imaging a subject.

Conventionally, an imager apparatus of this kind has been disclosed in JP-B-4-6154 entitled "Camera Integrated VTR Having Monitor TV". This camera integrated VTR has a VTR unit and a monitor TV unit integrally accommodated in a housing, with a video camera unit pivoted substantially in a central portion of the right side surface of the housing for rotation about a horizontal axis forming a right angle with the side plane. The camera integrated VTR may be entirely supported by the right hand of a user, or the housing may be supported by the left hand such that the monitor unit opposes the user while the video camera unit is held and rotated by the right hand relative to the monitor unit to change an inclined angle of the video camera unit for imaging a subject. Also, an article "High Image Quality MS Movie VL-HL1" by Etsuo Hoshikawa et al. (Sharp Technical Report Vol. 54, No. 11 pp. 67–70, 1992) describes an imager apparatus which has a VTR and a liquid crystal display integrated on the left side of a housing such that they are pivoted for rotation relative to each other.

The kind of imager apparatus as mentioned above is structured such that the video camera unit may be rotated by an angular distance of 180 to face to the same direction as the monitor unit does. This mechanism allows the user to image himself while viewing his image on the monitor unit. Generally, the video camera is set to obtain an upright image without topsy-turvy when a subject in front of the user is to be imaged. Therefore, if the video camera is rotated by 180 about the horizontal axis, an image is displayed or recorded in an upside-down state. In order to correct such an upside-down image of the user himself to an upright image for recording, the video camera unit is first directed to the user, and then the monitor unit is rotated by 180 about the horizontal axis to face to the user. In this event, since the image would be displayed upside down on the monitor unit if the vertical scanning was started from the uppermost left position on the screen of the monitor unit as is the case of normal imaging, the vertical scanning is inverted, i.e., started from the lowermost right position of the screen to turn over the display on the monitor unit, and consequently an upright image is produced on the monitor unit.

Since the vertical scanning of the monitor unit is performed from the lowermost line instead of the uppermost line of the screen, upright images are usually displayed on the screen when the video camera unit and the monitor unit face to the same direction. Stated another way, even if the video camera unit is normally held with the monitor unit rotated by 180 about the horizontal axis, upright images are displayed on the monitor unit. On the contrary, even if the monitor unit is normally held with the video camera unit rotated by 180 about the horizontal axis, upright images are displayed on the monitor unit. In summary, upright images are usually displayed on the monitor unit even when either the video camera unit or the monitor unit is turned over. In view of recording images by a recording apparatus such as VTR, it is correct to normally hold the video camera unit and turn the monitor unit over. However, it is often the case that, during imaging, the user holds the monitor unit at a constant angle (the screen of the monitor unit generally faces the user) and changes the angle of the video camera unit to follow a subject. Therefore, even when the user images himself, the user often rotates the video camera unit by 180 with the monitor unit left at a fixed position, considering that the same imaging way also applies in this case. As a result, upside down images are recorded on a recording medium by a recording apparatus.

Also, in the prior art examples described in JP-B-4-6154 and Hoshikawa's article, the imager apparatus is such a type that the user holds the video camera unit for imaging, where the video camera unit has a size equal to or close to that of the VTR unit or the monitor unit, and the VTR unit and the monitor unit are rotatably pivoted in the video camera unit. On page 70 of the Hoshikawa's article, a rotating member is disclosed for coupling the video camera unit and the VTR liquid crystal monitor unit. Since the rather heavy VTR unit and monitor unit are rotatably pivoted in the large video camera unit, joining portions for supporting these components require high strength, as will be also appreciated from the fact that a holder member such as a mechanism hold frame is needed. The structure for ensuring this high strength leads to a larger size and increased weight of the whole imager apparatus.

SUMMARY OF THE INVENTION

It is an object of the present invention to provide an imager apparatus which is capable of usually displaying or recording upright images on a monitor or by a recording apparatus.

It is another object of the present invention to provide an imager apparatus which only requires small and light joining members for joining a camera with a housing.

To achieve the above objects, the present invention provides an imager apparatus which comprises a signal switch means in a housing for switching a signal when detecting that a video camera is directed to a monitor side, and an image arrangement convertor circuit disposed between a camera circuit and image display means and recording means, including a random access memory (RAM), a write address generator circuit, and a read address generator circuit. The video camera is pivoted on the housing for rotation in the horizontal direction. Also, a character or figure, which is identifiable if turned over, is usually displayed on a monitor. A video camera unit is composed of a lens and an imager device, and is rotatably pivoted on an edge portion of the housing which accommodates the monitor.

The image arrangement convertor circuit is composed of the random access memory (RAM), the write address generator circuit and the read address generator circuit. The order of reading video signals stored in the RAM is defined by the order of read addresses generated by the read address generator circuit. An upright image is displayed if the reading order is the same as the writing order defined by the order of write addresses generated by the write address generator, while an upside-down image is displayed if the read address generating order is reverse to the write address generating order. Thus, when the monitor unit is normally held while the video camera is rotated by 180 about the horizontal axis to be directed to the monitor side, the signal switch means forces the read address generator circuit to generate read addresses in the order reverse to the order of write addresses generated by the write address generator circuit, whereby a video signal to be displayed and recorded is turned over, and consequently an upright image is displayed on the monitor or recorded by the recording apparatus.

Since the video camera is pivoted on the housing for rotation in the horizontal direction, the video camera, even when directed to the user, i.e., to the same side as the monitor, is rotated about a vertical axis in the horizontal direction to face to the monitor side, an image to be displayed or recorded is not turned over, but an upright image can be usually displayed or recorded.

A vertically or horizontally asymmetric character or figure is usually displayed on the monitor. Thus, when the monitor is rotated by 180° to face to the same direction as the video camera does, the vertical scanning direction of the monitor is inverted to display an upright image and character or figure on the monitor. It can be seen from the display on the monitor that the upright image is also recorded by a recording apparatus. On the contrary, when the video camera is rotated by 180° to face to the same direction as the monitor does, an upright character or figure signal from the character/figure generator circuit is superimposed on a signal representing an upside-down image from the video camera. Since the vertical scanning direction is inverted in the monitor, an upright image and an upside-down character or figure are displayed on the monitor. It can be seen from the upside down character or figure displayed on the monitor that the imaging state is not normal, from which recognition is made that the video camera must be returned to the original position and the monitor be rotated by 180°. Since a vertically asymmetric character or figure is displayed as a mirrored character or figure when the horizontal scanning direction of the monitor is inverted to produce a mirrored image, it is recognized from the mirrored character or figure that a displayed image is a mirrored image.

The video camera unit is made small and pivoted on an edge of the housing for rotation about an axis parallel to the edge, so that a less strength is required for joining members and accordingly the joining members can be reduced in size and weight. This structure also allows the user to manipulate the video camera with a thumb or index finger for setting an imaging angle of the video camera unit.

BRIEF DESCRIPTION OF THE DRAWINGS

FIG. 12 is a rear view of the imager apparatus shown in FIG. 11;

FIG. 13 is a cross-sectional view taken along a line C—C in FIG. 12;

FIGS. 14–16 are diagrams for explaining the operation of a mechanism shown in FIG. 13;

DESCRIPTION OF THE PREFERRED EMBODIMENTS

Figure 1:
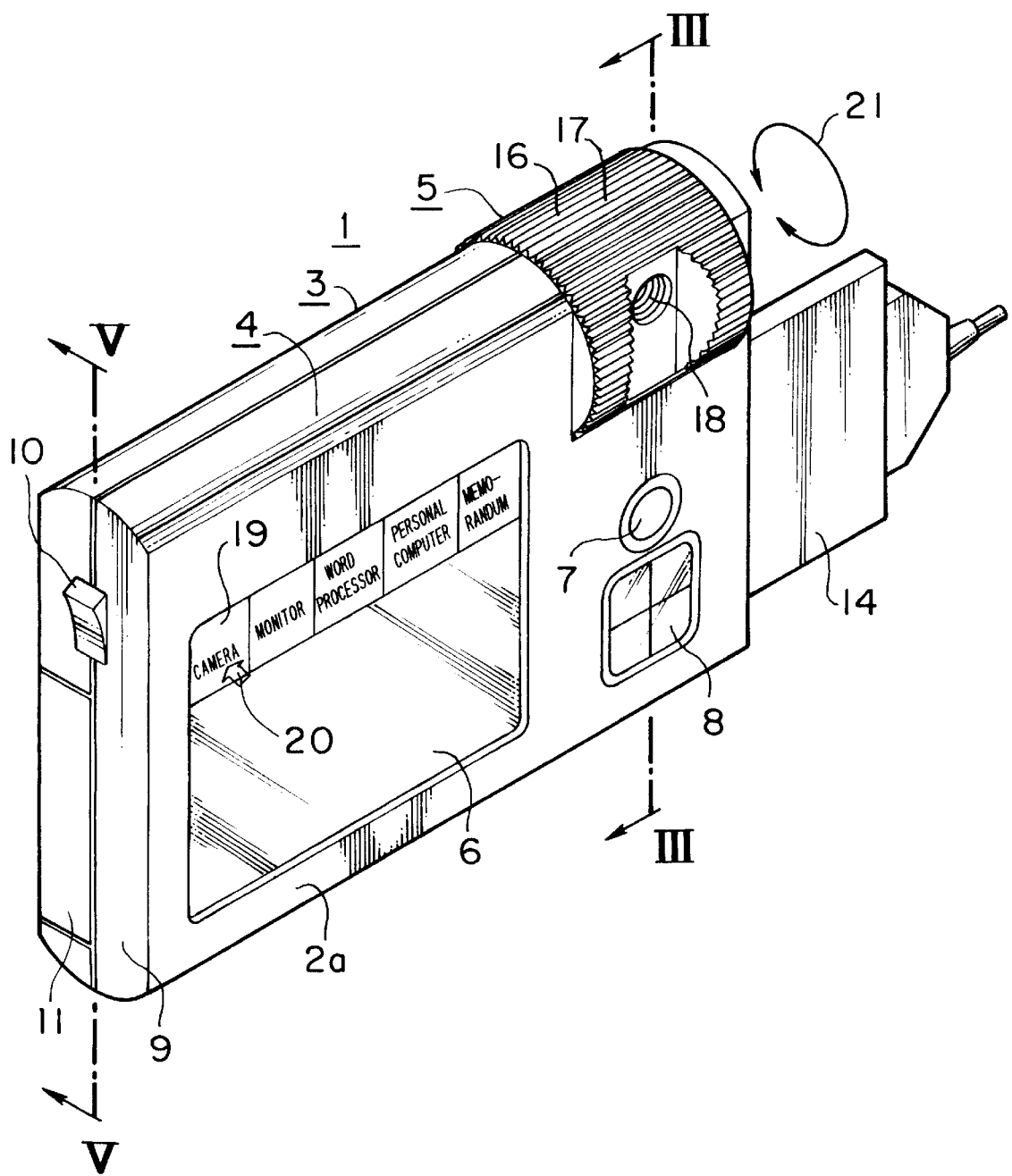
FIG. 1 is a perspective view showing an outer appearance of an imager apparatus according to a first embodiment of the present invention, viewed from the front side thereof.
Figure 2:
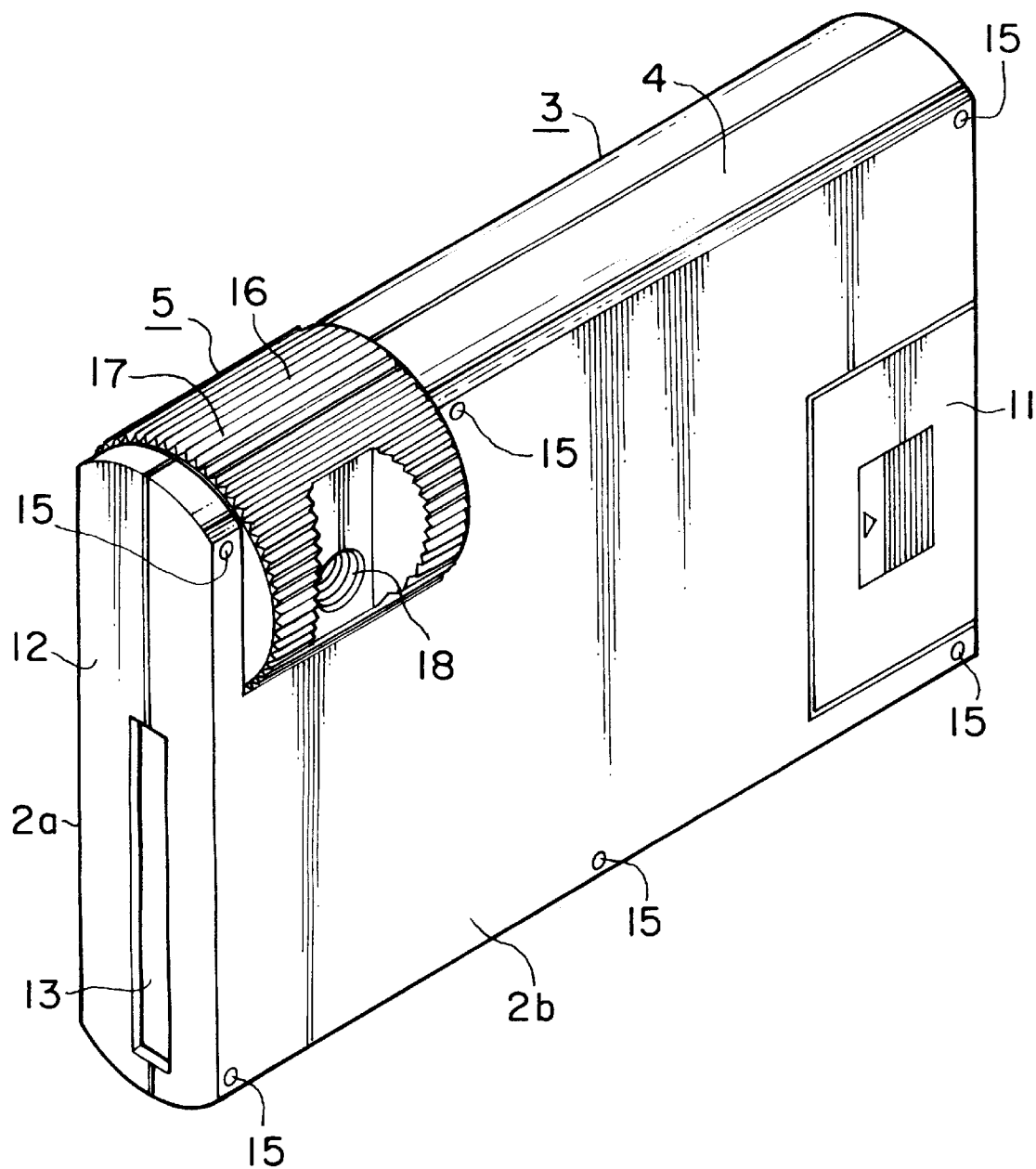
FIG. 2 is a perspective view showing an outer appearance of the imager apparatus according to the first embodiment of the present invention, viewed from the rear side thereof.

A first embodiment of the present invention is shown in FIGS. 1 and 2. FIG. 1 is a perspective view showing an outer appearance of an imager apparatus 1 including a front panel 2a, and FIG. 2 shows a perspective view including a rear panel 2b.

The imager apparatus 1 has a video camera unit 5 rotatably pivoted on a right end portion of an upper edge 4, a liquid crystal display 6 accommodated in the housing 3, a selection button 7 and a cursor key 8 arranged on the front panel 2a, a power supply switch 10 and a battery-cover 11 arranged on a left side surface 9 of the housing 3, and a card slot 13 formed in a right side surface 12 of the housing 3 for inserting a PCMCIA card 14. The rear panel 2b of the housing 3 are formed with six screw holes 15 for assembling the housing 3. The video camera unit 5 has a camera case 16 formed with anti-slip knurl 17 on the surface thereof. An imaging hole 18 is also formed in the video camera unit 5. The cursor key 8 is provided for moving a cursor 20 on items 19 displayed on the screen of the liquid crystal display 6.

FIG. 1 shows a state of the imager apparatus 1 in which the imaging hole 18 of the video camera unit 5 faces to the same direction as the front panel 2a does, so that the user or an object existing in front of the front panel 2a is imaged and displayed on the screen of the liquid crystal display 6. Since the video camera unit 5 is pivoted on a right end portion of the upper edge 4 for rotation in rotating directions indicated by arrows 21 parallel to the extending direction of the upper edge 4, the user may support the housing 3 with his left hand to hold the liquid crystal display 6 at an angle which facilitates the viewing, and hold and rotate the video camera unit 5 with the thumb and index finger of his right hand. In this way, the user can freely set an imaging angle for the video camera unit 5. The cursor 20 is superimposed on a target item 19 with the cursor key 8, and the selection button 7 is depressed to select the displayed function or item. For example, when the cursor 20 is moved to "Camera" within the items 19 and the selection button 7 is depressed to select a camera function, the imager apparatus 1 functions as a video camera. In response, the video camera unit 5 is powered on to display an imaged subject on the liquid crystal display 6. In this event, the liquid crystal display 6 functions as an electronic view finder. When the cursor 20 is moved to "Monitor" within the items 19, the video camera unit 5 is powered off, so that the display on the liquid crystal display 6 is switched to an image which has previously been stored in the video camera unit 5. When the cursor 20 is moved to "Word Processor" within the items 19, the portable imager apparatus 1 functions as a word processor. Likewise, moving the cursor 20 to "Personal Computer" or "Memo" causes the imager apparatus 1 to function as a computer or an electronic agenda, respectively.

The PCMCIA card 14 has a card performance and a card size, for example, defined by JEIDA/PCMCIA (Japan Electronic Industry Development Association/Personal Computer Memory Card International Association) standard which is an industrial standard. The card size defined by the standard should have a length of 85.6 mm, a width of 54 mm, and a thickness of 3.3 mm for Type I, and a length of 85.6 mm, a width of 54 mm, and a thickness of 5 mm or less for Type II. The number of pins for connection is defined to be 68 for both Type I and Type II. With the employment of the standard connector shape, the imager apparatus 1 can be connected to a variety of computer-based equipment and telephonic devices having different specifications for communicating data and information therebetween.

FIG. 2 shows a state of the imager apparatus 1 in which the video camera unit 5 is rotated so that the imaging hole 18 faces to the same direction as the rear panel 2b does. In other words, this is a normal imaging situation. In this state, a video camera 22 is upstanding, and a displayed image and a recorded image are upright, so that there is no problem. The selection button 7 functions as a shutter button to record an image displayed on the liquid crystal display 6 as a still image.

The internal structure of the imager apparatus 1 is shown in FIGS. 3–8.

Figure 3:
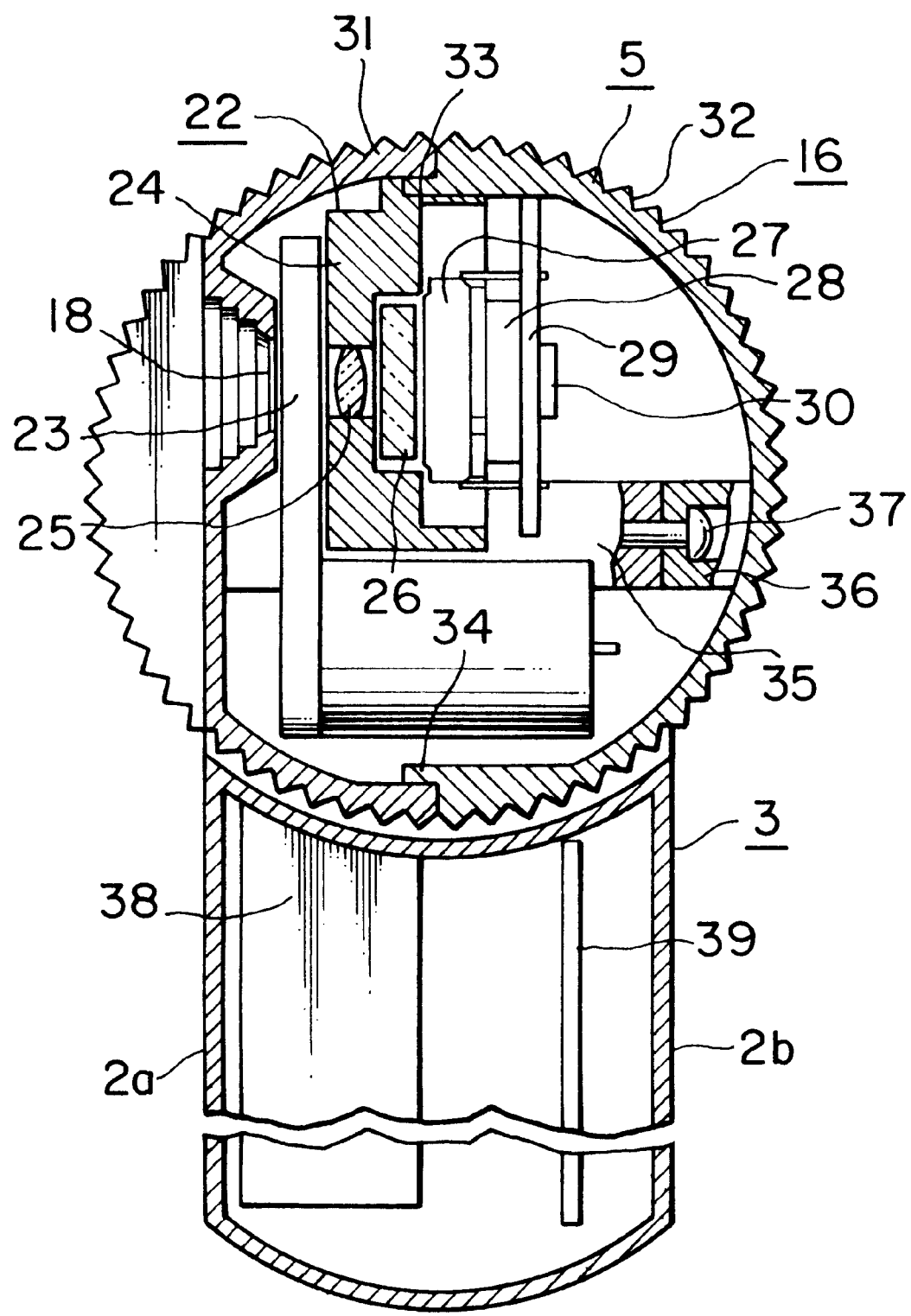
FIG. 3 is a cross-sectional view taken along a line A—A in FIG. 1.

FIG. 3 is a cross-sectional view of the imager apparatus 1 taken along a line A—A in FIG. 1. The camera case 16 of the video camera unit 15 is formed with the imaging hole 18, and the knurl 17 is engraved on the outer surface of the camera case 16. In the camera case 16, the video camera 22 is arranged in an overturned state. A method of correcting an upside-down image due to the overturned video camera 22 to an upright image for display and recording will be described later. The video camera 22 includes a shutter 23, a lens case 24, a lens 25, a quartz filter 26, an imager device 27, a mounting plate 28, and a camera circuit board 29. When the shutter 23 is opened, light penetrates through the imaging hole 18, and an image of a subject is focused on the imager device 27 by the lens 25. The quartz filter 26 serves to reduce moire and cut an infrared region. The camera circuit board 29 is fixed on the mounting plate 28 with screws 30, and the mounting plate 28 in turn is fixed to the camera case 16 with screws (see FIG. 6). The camera case 16 is composed of a front case portion 31 and a rear case portion 32, wherein the front case portion 31 and the rear case portion 32 are assembled into the camera case 16 with tabs 33 and 34 of the rear case portion 32 being inserted into the front case portion 31. Also, the front case portion 31 and the rear case portion 32 are secured respectively to pillars 35, 36 integrally formed therewith with screws 37. A liquid crystal panel 38 and a circuit board 39 are disposed in the housing 3. The circuit board 39 includes a signal processing circuit for the video camera unit 5, a driver circuit for the liquid crystal panel 38, a system circuit, a power supply circuit, and so on.

Figure 4:
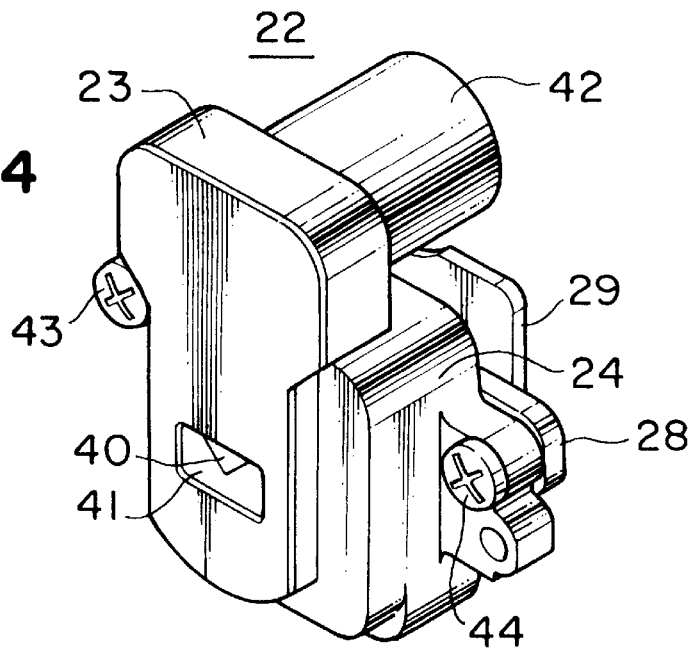
FIG. 4 is a perspective view showing an outer appearance of a video camera.

FIG. 4 is a perspective view showing an outer appearance of the video camera 22. The video camera 22 includes the shutter 23, the lens case 24, the mounting plate 28, and the camera circuit board 29. The shutter 23 includes two blades 40, 41 and a motor 42. The two blades 40, 41 are driven by the motor 42 to move in the vertical direction, and also function as an iris. The shutter 23 is secured to the lens case 24 with a screw 43. The mounting plate 28 is also secured to the lens case 24 with a screw 44.

Figure 5:
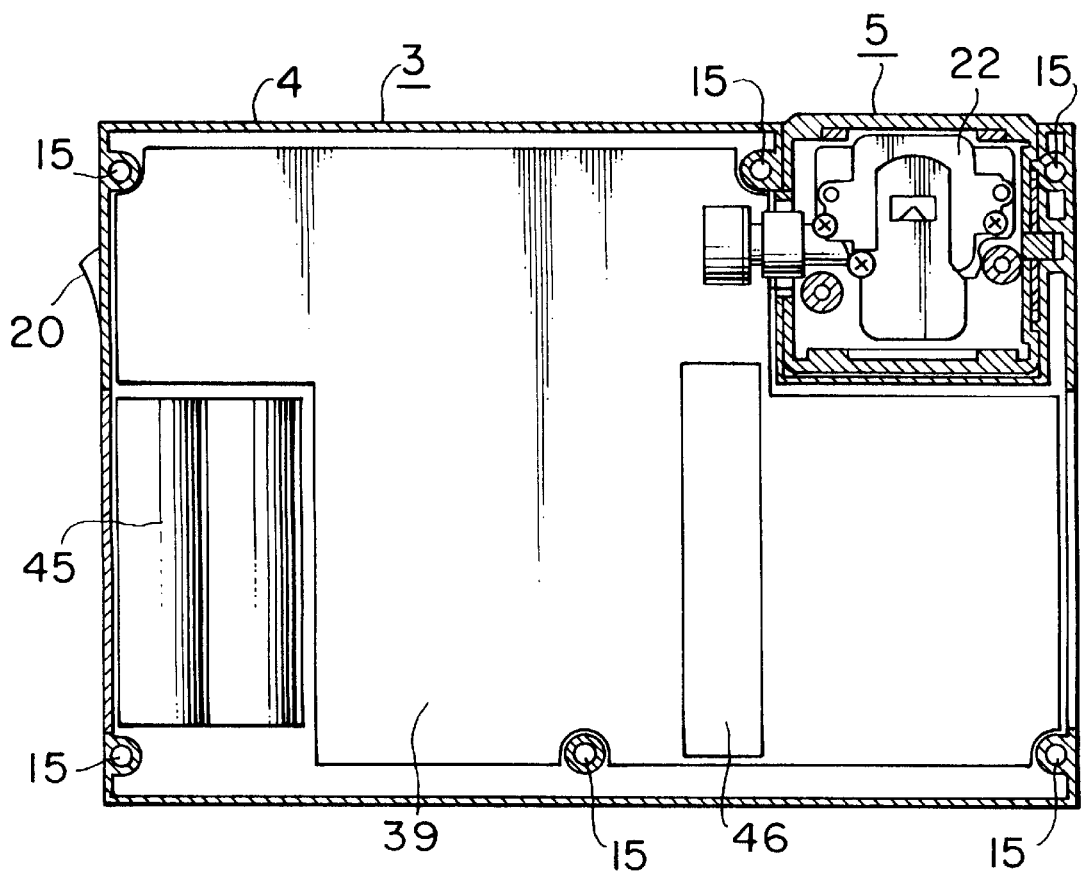
FIG. 5 is a cross-sectional view taken along a line B—B in FIG. 2.

FIG. 5 is a cross-sectional view taken along a line B—B in FIG. 1. It can be seen that the circuit board 39 is disposed in the housing 3, a battery 45 is disposed in a left side portion of the housing 3, and the video camera unit 5 is rotatably pivoted on a right end portion of the upper edge 4. The housing 3 further includes a power supply switch 10, six screw holes 15, and a host connector 46 for the PCMCIA card 14.

Figure 6:
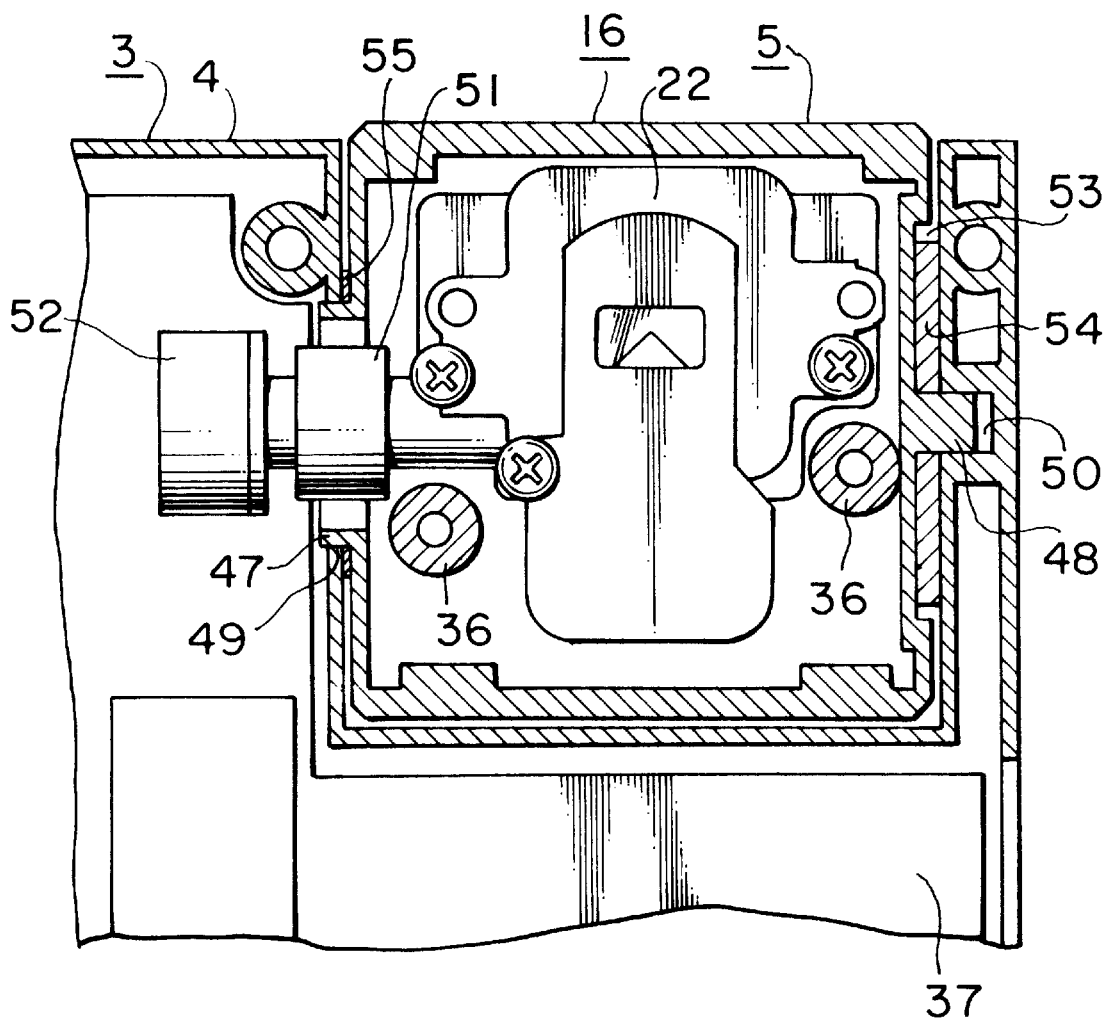
FIG. 6 is an enlarged view showing details of a video camera portion in FIG. 5.

FIG. 6 is a partially enlarged view of FIG. 5 showing the video camera unit 5 in detail. The camera case 16 has a cylinder 47 at one end and a shaft 48 on the other end. The cylinder 47 is fitted into a hole 49 formed through the housing 3, while the shaft 48 is rotatably fitted into a recess 50 extending into a side wall of the housing 3. A flexible board 51 passes through the cylinder 47. The flexible board 51 has one end connected to the camera circuit board 29 by soldering and the other end connected to a connector 52 on the circuit board 39. The shaft 48 of the camera case 16 is formed with a groove 53 on the peripheral surface thereof, in which a friction mechanism 54 is fitted coaxially with the shaft 48. Also, a spacer 55 is fitted on the cylinder 47 so as to allow the camera case 16 to smoothly rotate relative to the housing 3.

Figure 7:
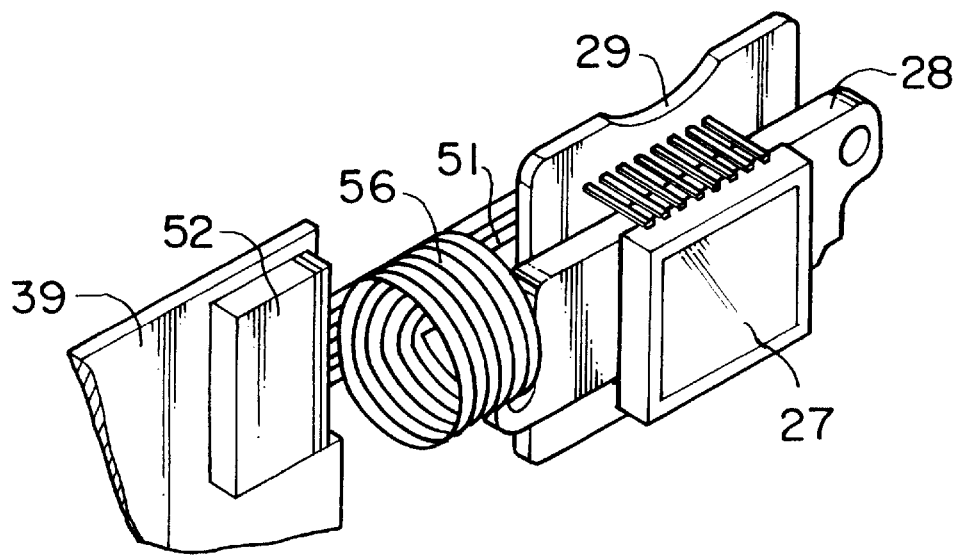
FIG. 7 is an enlarged perspective view showing the structure of the video camera illustrated in FIG. 5.

FIG. 7 is a partial enlarged perspective view showing a portion of FIG. 5. The flexible board 51 is electrically connected to the camera circuit board 29 by soldering, while the imager device 27 is electrically connected to the camera circuit board 29 by soldering with the mounting plate 28 interposed therebetween. The flexible board 51 connects the camera circuit board 29 to the connector 52 on the circuit board 39. The flexible board 51 is formed with a coil-shaped margin 56 so as to prevent the flexible board 51 from being twisted off when the video camera unit 5 is rotated.

Figure 8:
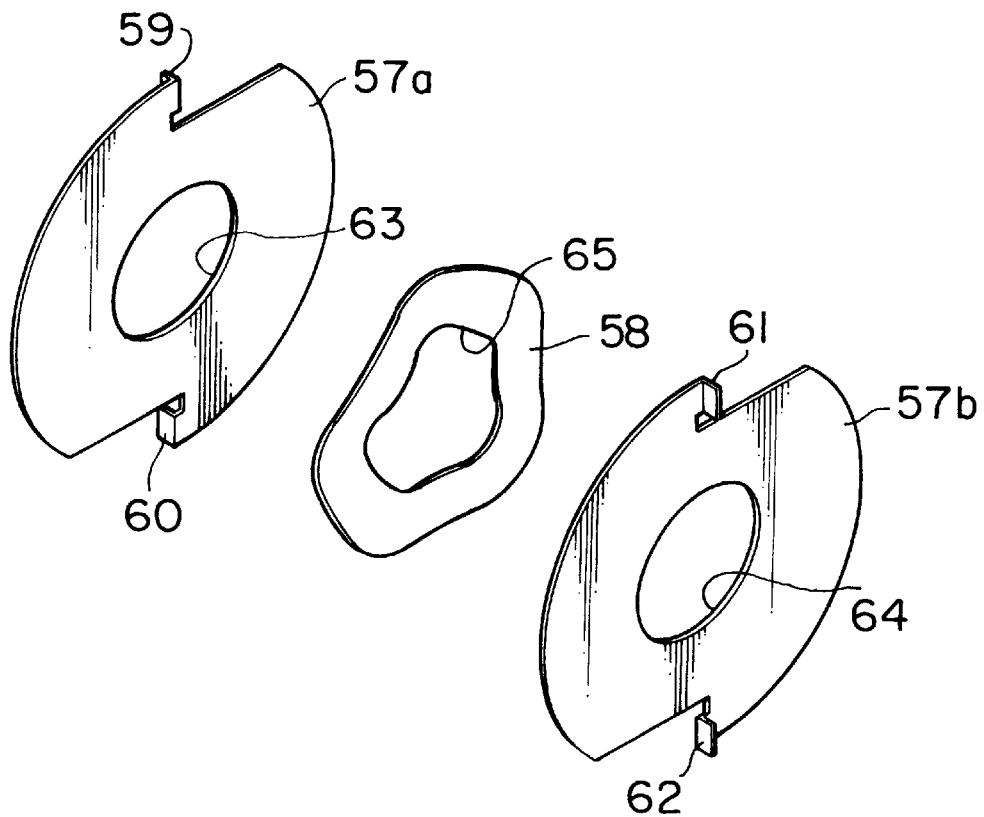
FIG. 8 is an exploded perspective view showing a friction mechanism.

FIG. 8 is an exploded perspective view showing the friction mechanism 54. The friction mechanism 54 is composed of slip rings 57a, 57b and a wavy leaf spring 58, all of which are made of metal. The slip rings 57a, 57b are formed with pawls 59, 60, 61, 62 as excessive rotation limiters which are raised up from their associated slip rings 57a, 57b. The wavy leaf spring 58 is sinuous. The slip rings 57a, 57b both have throughholes 63, 64 in their respective central portions through which the shaft 48 is inserted. The wavy leaf spring 58 also has a throughhole 65 through which the shaft 48 is inserted.

Figure 9:
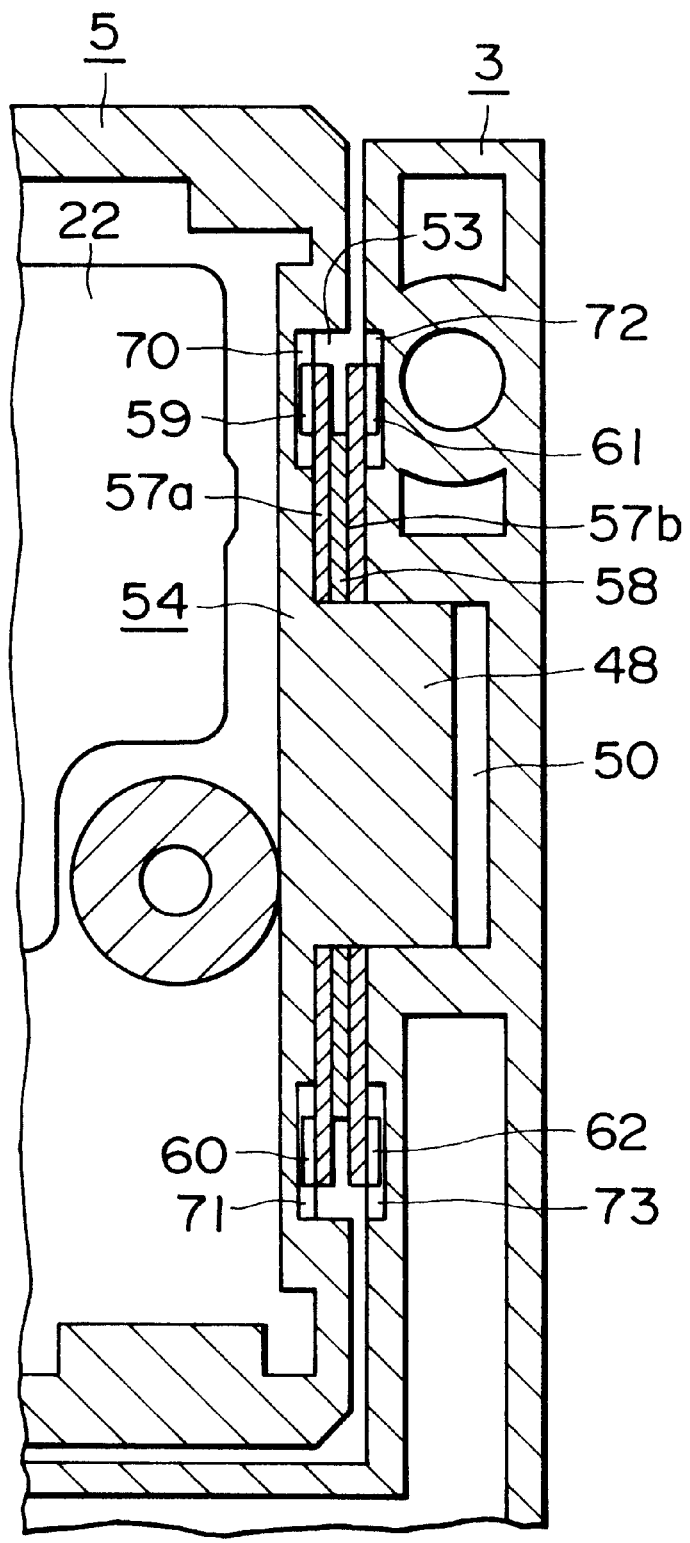
FIG. 9 is an enlarged view showing how the friction mechanism is incorporated in the structure of FIG. 6.

FIG. 9 shows an enlarged view of a portion of FIG. 6 in which the friction mechanism 54 is incorporated into the video camera unit 5. The claws 59, 60 are fitted into closed narrow recesses 70, 71 formed in the camera case 16, respectively, while the claws 61, 62 are fitted into closed narrow recesses 72, 73 formed in the housing 3, respectively. The wavy leaf spring 58 is sandwiched between the slip rings 57a, 57b to form a simple free stop mechanism which urges the slip rings 57a, 57b outwardly for absorbing looseness of the camera case 16 in the axial direction as well as applies an adequate friction force to the rotation of the camera case 16 to provide smooth rotation and braking force.

Figure 10:
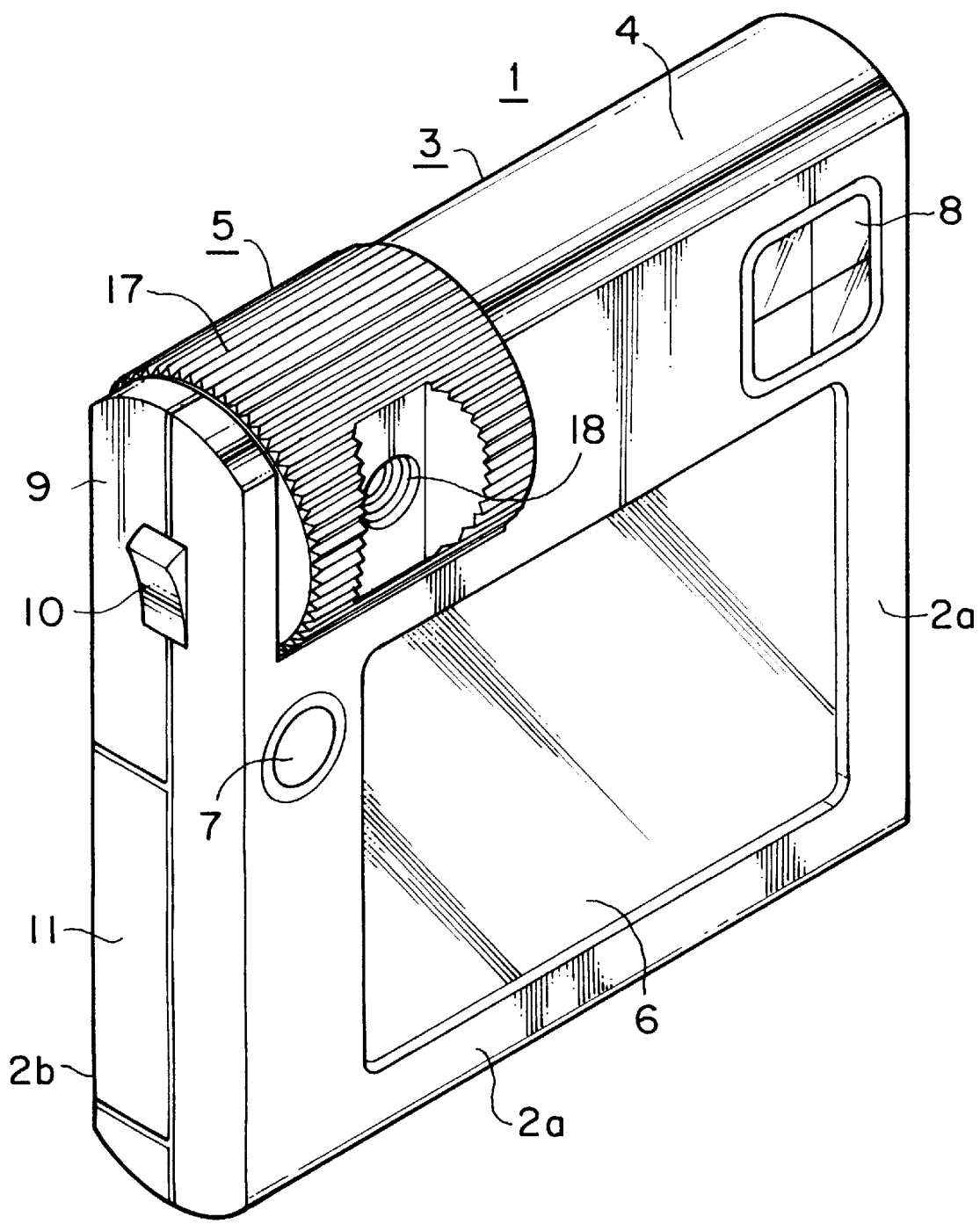
FIG. 10 is a perspective view showing an outer appearance of an imager apparatus according to a second embodiment of the present invention, viewed from the front side thereof.

FIG. 10 is a perspective view showing an outer appearance of an imager apparatus 1 according to a second embodiment of the present invention. The imager apparatus 1 has a video camera unit 5 rotatably pivoted on a left end portion of an upper edge 4 of a housing 3, a liquid crystal display 6 accommodated in the housing 3, a selection button 7 and a cursor key 8 disposed on a front panel 2a of the housing 3, and a power supply switch 10 and a buttery cover 11 disposed on a left side surface 9 of the housing 3. In this embodiment, since the imager apparatus 1 allows the user to hold the housing 3 with the left hand and rotate the video camera unit 5 with the thumb and index finger of the left hand for adjusting an imaging angle, the user can manipulate the imager apparatus 1 only with a single hand.

Also, if the video camera unit 5 is rotatably placed on the upper edge 4 right above the liquid crystal display 6 (i.e., at an intermediate position between the position of the video camera 5 in the first embodiment (right end portion) and the position of the video camera 5 in the second embodiment (left end portion)), parallax can be most reduced when the user himself is displayed on the liquid crystal display 6.

Figure 11:
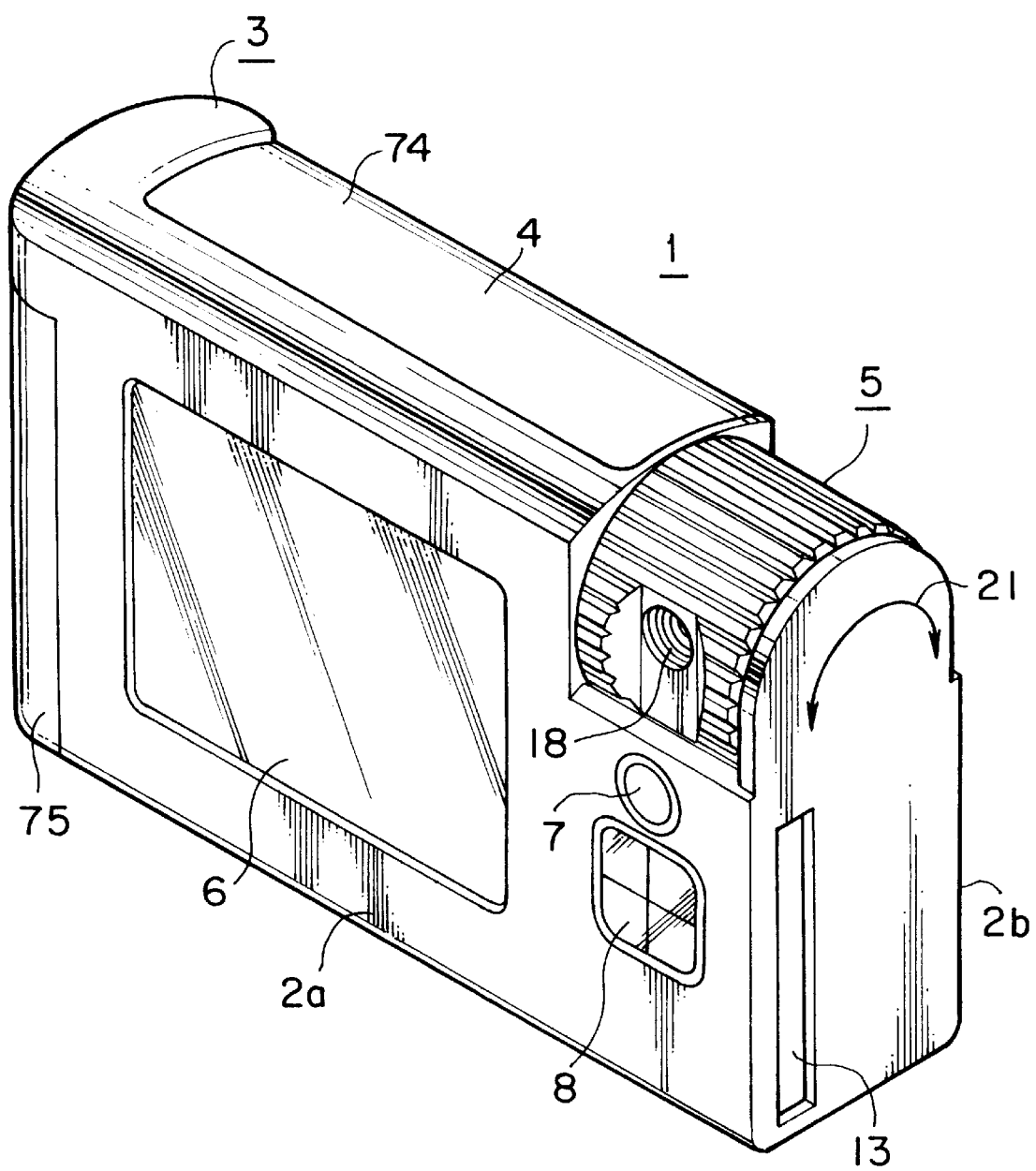
FIG. 11 is a perspective view showing an outer appearance of an imager apparatus according to a third embodiment of the present invention, viewed from the front side thereof.

FIGS. 11 and 12 show a third embodiment of the present invention. FIG. 11 is a perspective view showing an outer appearance of an imager apparatus 1 including a front panel 2a, and FIG. 12 shows a front view of a rear panel 3 of the imager apparatus 1. The imager apparatus 1 has a video camera unit 5 pivoted on a right end portion of an upper edge 4 of a housing 3 for rotation in rotating directions indicated by arrows 21 parallel to the extending direction of the upper edge 4. A liquid crystal display 6 is accommodated in the housing 3. A selection button 7 and a cursor key 8 are disposed on a front panel 2a of the housing 3. A VTR 74 is built in a rear panel 2b of the housing 3, and a battery 75 is positioned in a left side portion of the rear panel 2b. FIG. 11 shows a state in which the video camera unit 5 is directed to the same direction as the front panel 2a faces, such that the user or a subject in front of the front panel 2a is displayed on the liquid crystal display 6. FIG. 12 shows a state in which the video camera unit 5 is rotated to face to the same direction as the rear panel 2b does, i.e., a normal imaging situation.

FIG. 13 is a cross-sectional view taken along a line C—C in FIG. 12. The video camera unit 5 is pivoted on the housing 3 for rotation in the clockwise direction 76 and the counter-clockwise direction 77. FIG. 13 shows that the video camera unit 5 is turned such that an imaging hole 18 thereof faces to the same direction as the rear panel 2b does. A knurl 17 is engraved on the outer surface of the camera case 16 for preventing slippage. In the camera case 16, a video camera 22 is accommodated in an upstanding position. A circuit board 78 is also disposed in the housing 3.

FIG. 14 is a diagram for explaining an operation of the video camera unit 5 shown in FIG. 13. FIG. 14 illustrates that the video camera unit 5 is rotated in the counter-clockwise direction 77 to the extent that the imaging hole 18 faces to the same direction as the front panel 2a does. In this state, the video camera 22 disposed in the camera case 16 is turned over, so that an upside-down image would be recorded by the VTR 74 and displayed on the liquid crystal display 6 if no measures were taken. For correcting such an upside-down image to an upright image for recording and displaying, a memory is used. A method of converting an upside-down image to an upright image will be described later.

Figure 15:
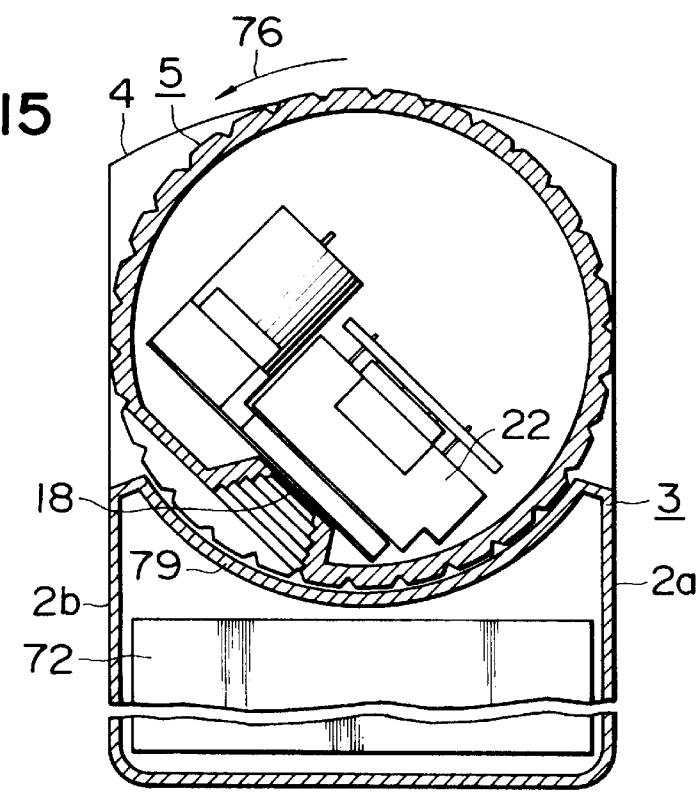

FIG. 15 is a diagram for explaining another operation of the video camera unit 5 shown in FIG. 13. When the video camera unit 5 is rotated in the clockwise direction 76 to the extent that the imaging hole 18 is brought into contact with and closed by a housing portion 79, a reproduction mode is entered so that the VTR 74 is initiated to reproduce previously recorded images.

Figure 16:
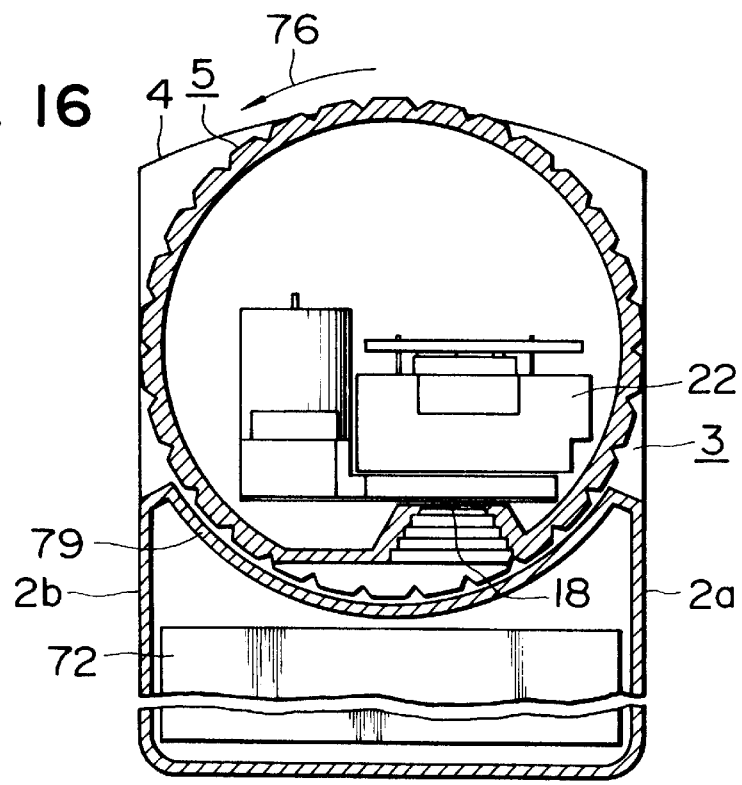

FIG. 16 is a diagram for explaining a further operation of the video camera unit 5 shown in FIG. 13. When the video camera unit 5 is further rotated in the clockwise direction 76 to turn the imaging hole 18 downward, the video camera unit 5 is powered off. At this time, the imaging hole 18 is brought into contact with the housing portion 79 and completely closed thereby. When the imaging is not performed, the imaging hole 18 having the lens therein is brought in opposition to the housing portion 79 to prevent the lens from exposing to the outside, thus eliminating a cover for protecting the lens.

Figure 17:
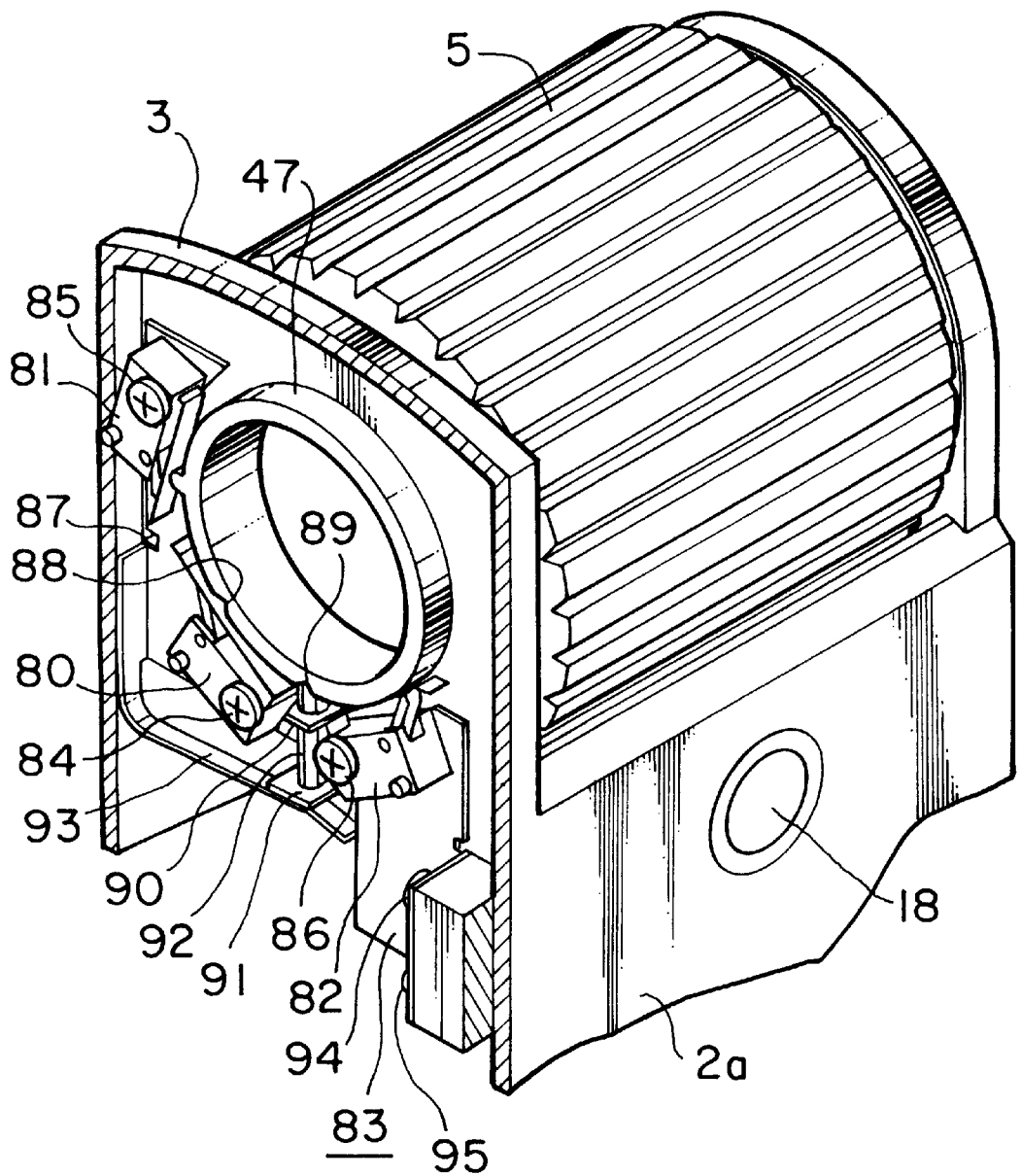
FIG. 17 is a perspective view of a video camera unit with a cross-section taken along a line D—D in FIG. 12.

FIG. 17 is a perspective view with a cross-section taken along a line D—D in FIG. 12, showing the positions of a power supply and image switches for switching an upside-down image to an upright image. Three switches 80, 81, 82 are positioned around the cylinder 47 and fixed to a plate 83 with screws 84, 85, 86, respectively. The cylinder 47 is formed with a protrusion 87 and two recesses 88, 89. Two collars 90, 91 are erected from the plate 83 for vertically slidably holding thereon a hexagonal column 92 which has its tip shaped in a wedge form. The hexagonal column 92 has its tip urged against the cylinder 47 by a spring 93 constituting part of the plate 83, such that the tip of the hexagonal column 92 is inserted into the recess 88 or 89 to perform a click-stop function. The plate 83 is fixed to the housing 3 with two screws 94, 95. In FIG. 17, the protrusion 87 is pushing the switch 81 to indicate a reproduction mode.

Figure 18:
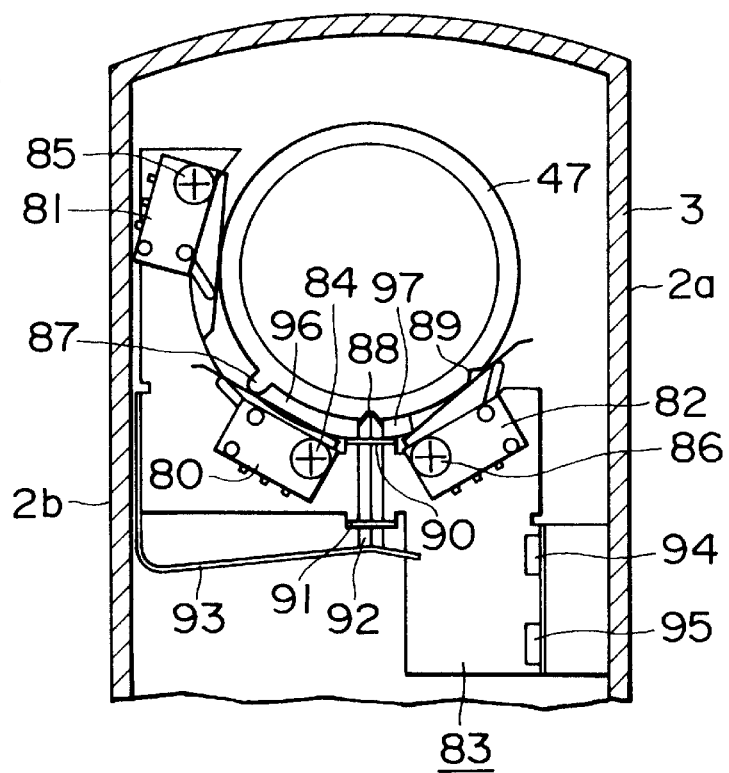
FIG. 18 is a cross-sectional view taken along the line D—D in FIG. 12.

FIG. 18 is a front view of the mechanism shown in FIG. 17 for explaining its operation, illustrating a state in which the protrusion 80 is pushing the switch 80 to power off the video camera unit 5. The protrusion 87 also abuts to a first stopper 96 formed in the housing 3 to prevent the video camera unit 5 from further rotating. The tip of the hexagonal column 92 is inserted into the recess 88 to perform a click-stop function.

Figure 19:
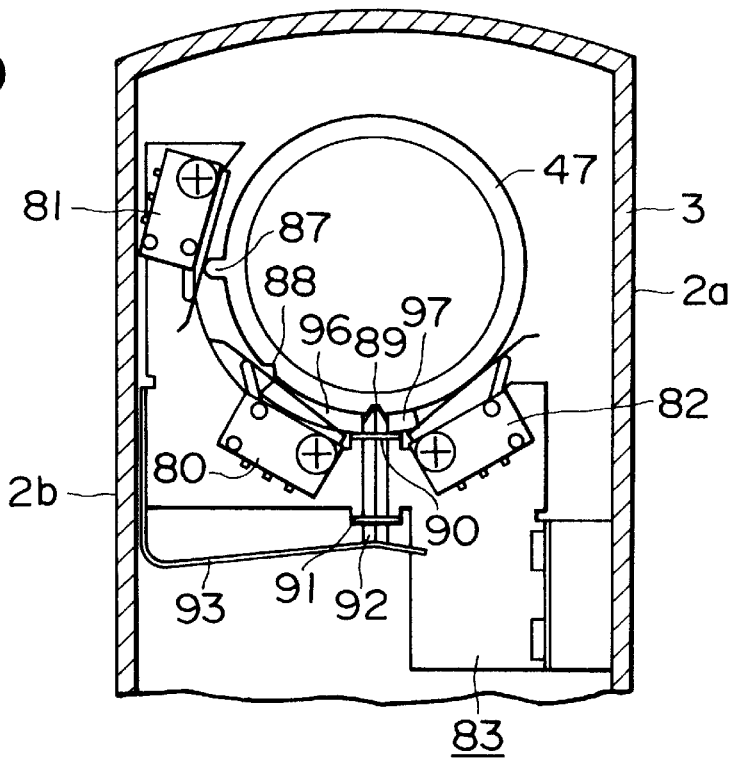
FIGS. 19–21 are diagrams for explaining the operation of a mechanism shown in FIG. 18.

FIG. 19 is a front view of the mechanism shown in FIG. 17 in another state. Specifically, illustrated is a state in which the protrusion 87 is pushing the switch 81 to only power on the video camera unit 5. The tip of the hexagonal column 92 is inserted into the recess 89 to again perform a click-stop function.

Figure 20:
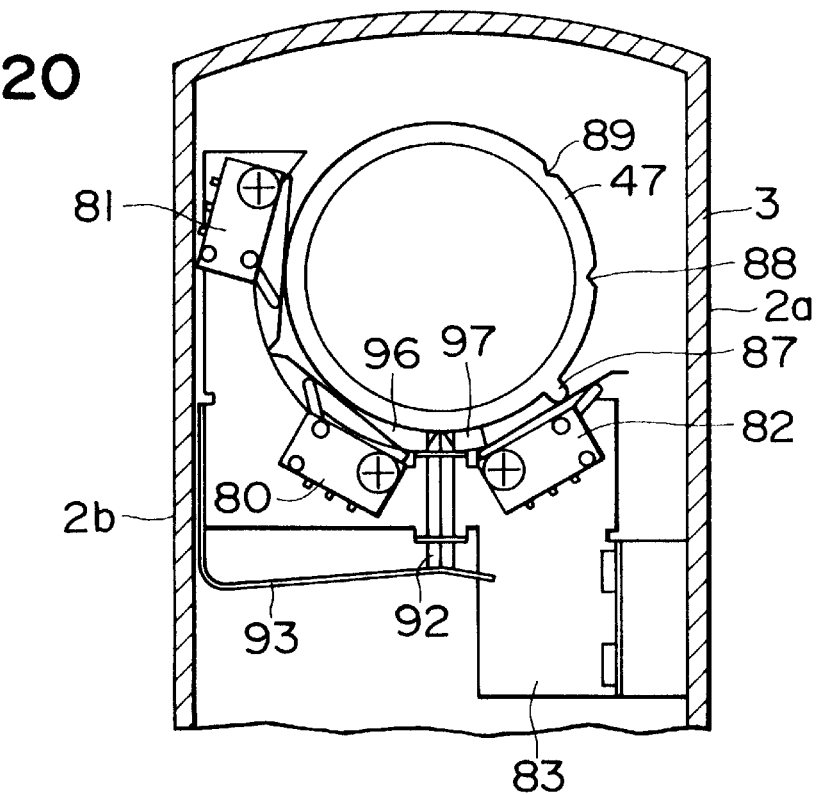

FIG. 20 is a front view of the mechanism shown in FIG. 17 for explaining its operation, illustrating a state in which the protrusion 87 is pushing the switch 82 to turn on. The illustrated state is for imaging the user himself. More specifically, as shown in FIG. 11, the imaging hole 18 of the video camera unit 5 is directed to the user's side. In this state, the video camera 22, facing to the same direction as the front panel 2a does, is turned over, as shown in FIG. 14. With the video camera 22 being turned over, an upside-down image would be displayed on the liquid crystal display 6 and likewise recorded by the VTR 74. The switch 82 is provided for detecting that the video camera 22 is turned over.

Figure 21:
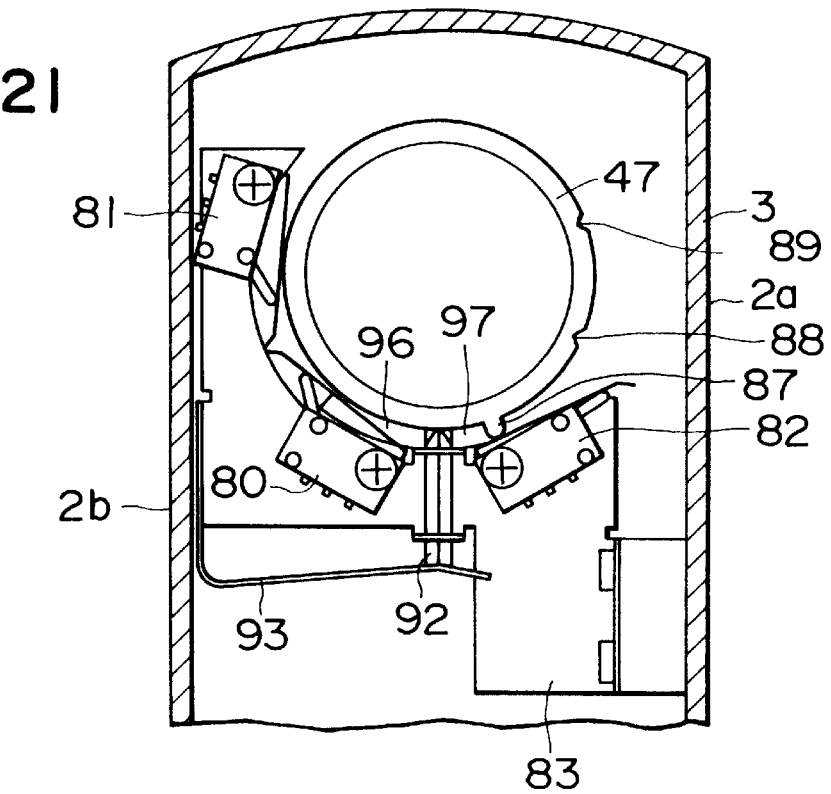

FIG. 21 is a front view of the mechanism shown in FIG. 17 for explaining its operation, illustrating a state in which the protrusion 87 abuts to a second stopper 97 to prevent excessive rotation of the video camera unit 5. The protrusion 87 is pushing the switch 82 to detect that a taken image is upside down.

Figure 22:
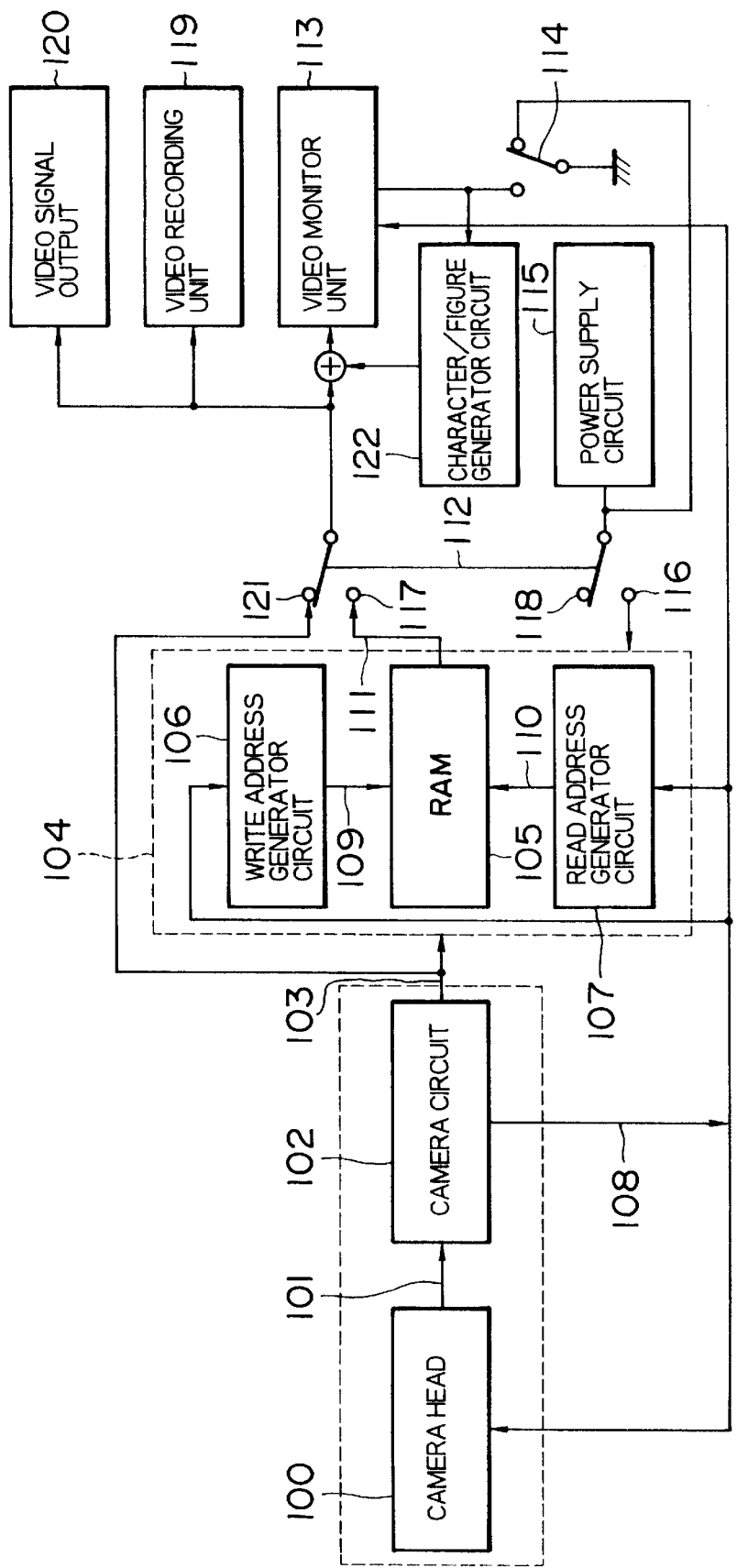
FIG. 22 shows a circuit block diagram of the imager apparatus according to the first–third embodiments.

FIG. 22 shows a block diagram of a circuit used in the first–third embodiments of the present invention. A camera head 100, which includes a light receiving lens, a solid-state imager device, a circuit for driving the solid-state imager device, and so on, generates an opto-electrically converted signal 101 which is inputted to a camera circuit 102. The camera circuit 102, which includes a camera signal processing circuit, a synchronization signal generator circuit, and so on, generates a video signal 103 in a television signal format from the opto-electrically converted signal 101. The camera head 100 and the camera circuit 102 surrounded by dotted rectangles constitute the video camera of the present invention.

The video signal 103 is next inputted to an image arrangement convertor circuit 104. The image arrangement convertor circuit 104 includes RAM (Random Access Memory) 105, a write address generator circuit 106, a read address generator circuit 107, and so on. The video signal 103 is stored into the RAM 105 of the image arrangement convertor circuit 104. In this event, the video signal 103 is stored into the RAM 105 at predetermined memory addresses in accordance with a memory address signal 109 outputted from the write address generator circuit 106 in a predetermined order in synchronism with a synchronization signal from the camera circuit 102. The video signal 103 once stored in the RAM 105 is read from the RAM 105 in accordance with a memory address signal 110 outputted from the read address generator circuit 107 in synchronism with the synchronization signal 108.

When the video signal does not represent an upside-down image but an upright image, i.e., when an upside-down image is not detected, the read address generator circuit 107 in the image convertor circuit 104 is forced to generate memory read addresses in accordance with the order in which write address generator circuit 106 has generated memory write addresses.

When the video signal 103 represents an upside-down image, this image should be converted to an upright image. As described above, whether an upside-down image has been taken is sensed based on a rotating angle of the video camera unit 5. When the video camera unit 5 is rotated to the state shown in FIGS. 1, 3, 10, 11, that is, when the imaging hole 18 of the video camera unit 5 faces to substantially the same direction as the front panel 2a of the housing 3 does, a video signal 103 representing an upside-down image is produced. In this event, the switch 82 shown in FIGS. 14, 20, 21 is pushed by the protrusion 87 to detect that the video signal 103 represents an upside-down image. When an upside-down image is detected by the switch 82 pushed by the protrusion 87, the read address generator circuit 107 is forced to generate addresses in the order reverse to that of the write address generator circuit 106, whereby a video signal 111 is read from the RAM 105 in the order reverse to the order in which the video signal 103 was written into the RAM 105. Thus, if an amount of video signal 103, for example, corresponding to one field portion of the television signal is stored into the RAM 105 and read therefrom in the reverse order during the next field period, a vertically and horizontally inverted video signal 111 can be produced. For producing a continuous television signal, the RAM 105 may be provided with a capacity of storing two field portions of video signal 103, such that a field of a video signal written into the RAM 105 one field period before is read therefrom at the same time the current field of the video signal is written thereinto.

Generally, the read address generator circuit 107 includes a counter. When a known up-down counter is employed therefor such that a counting direction may be switched by a switch means 112 between an increasing direction and a decreasing direction, the read address generating order can be readily switched to the same as or reverse to the write address generating order.

The video signal 111 is outputted to a video monitor unit 113, a video recording unit 119, and a video signal output unit 120 through an output terminal 117.

The operation of the circuit shown in FIG. 22 when the switch means 112 is provided will be described. The switch means 112 is involved in two pairs of terminals which are associated with each other. One pair of terminals are a terminal 116 connected to a power supply circuit 115 for supplying electric power to the image arrangement convertor circuit 104 and an output terminal 117 of the RAM 105, and the other pair of terminals are a terminal 118 for turning off the power supply to the image arrangement convertor circuit 104 and a terminal 121 for bypassing the image arrangement convertor circuit 104 to directly supply the output of the camera circuit 102 to the video monitor unit 113, the video recorder unit 119, or the video signal output terminal 120. When a video signal 103 representing a normal image is inputted, the switch means 112 is changed over to the terminal 121 and the terminal 118 for turning off the power supply to the image arrangement convertor circuit 104, such that the video signal 103 is outputted without passing through the image arrangement convertor circuit 104. By thus configuring the switch means 112, the image arrangement convertor circuit 104 is not operated when an image need not be turned over, i.e., when the video signal 103 represents an upright image, so that the power consumption can be reduced. If the video signal 103 is detected to be an upside-down image by the switch 82 shown in FIGS. 14, 20, 21 pushed by the protrusion 87, the switch means 112 is connected to the terminals 117, 116 by a microcomputer or the like, not shown. In the foregoing example, the detection as to whether an upside-down image is inputted or not is utilized to control the read address generator circuit 106 in the image arrangement convertor circuit 104 in terms of the order in which the read address generator circuit 106 generates memory read addresses. However, if the switch means 112 is provided, the order in which the read address generator circuit 107 generates memory read addresses may be fixedly set reverse to the order in which the write address generator circuit 106 has generated memory write addresses, such that a normal image can be produced by changing over the switch means 112 instead of switching the order of generating memory read addresses. In this way, an upright image can be produced instead of an upside-down image even when the user himself is to be imaged, in which case a normal video signal is produced as an upside-down image.

Also, the user may be left to determine whether an upright image converted from an upside-down image should be further inverted horizontally to produce a mirror image, only for images displayed on the video monitor unit 113 (except for those to be recorded by the video recording unit 119). In this case, a "real image/mirror image" selection button (not shown) may be provided on the surface of the housing such that the user may depress this button when such a mirror image is desired.

If a Braun tube monitor is employed as the video monitor unit 113, vertical and horizontal inversion can be readily accomplished by switching the connection of a deflection coil by a switch means 114. On the other hand, known liquid crystal displays typically utilize a shift register circuit to perform horizontal or vertical scanning, as described in "Color Liquid Crystal Display" edited by Shunsuke Kobayashi, published by Sangyo Tosho Kabushiki Kaisha, pp. 162–163,December, 1990. Therefore, when a liquid crystal monitor is employed as the video monitor unit 113, two series of shift registers may be equipped for horizontal and vertical scanning directions, respectively. The vertical and horizontal inversion can be readily accomplished by switching the two series of shift registers.

The horizontal inversion of a displayed image means generation of its mirror image. In this event, if a character or a figure displayed together with an image on the screen of the video monitor unit 13 is a mirror image, it is obvious that the displayed image is also a mirror image. A character/figure generator circuit 122 is composed of a read only memory (ROM) for storing dot-patterned characters or figures and a read address generator circuit. Changing the ROM read scan direction can be readily realized by known digital circuit techniques. For example, an up/down counter is employed for a counter associated with the read address generator circuit, and the direction of counting is switched for changing the direction in which a character or a figure is read from the ROM. Alternatively, a desired inverted character or figure may be previously stored in the ROM such that it is outputted therefrom instead of a non-inverted character or figure.

Figure 23:
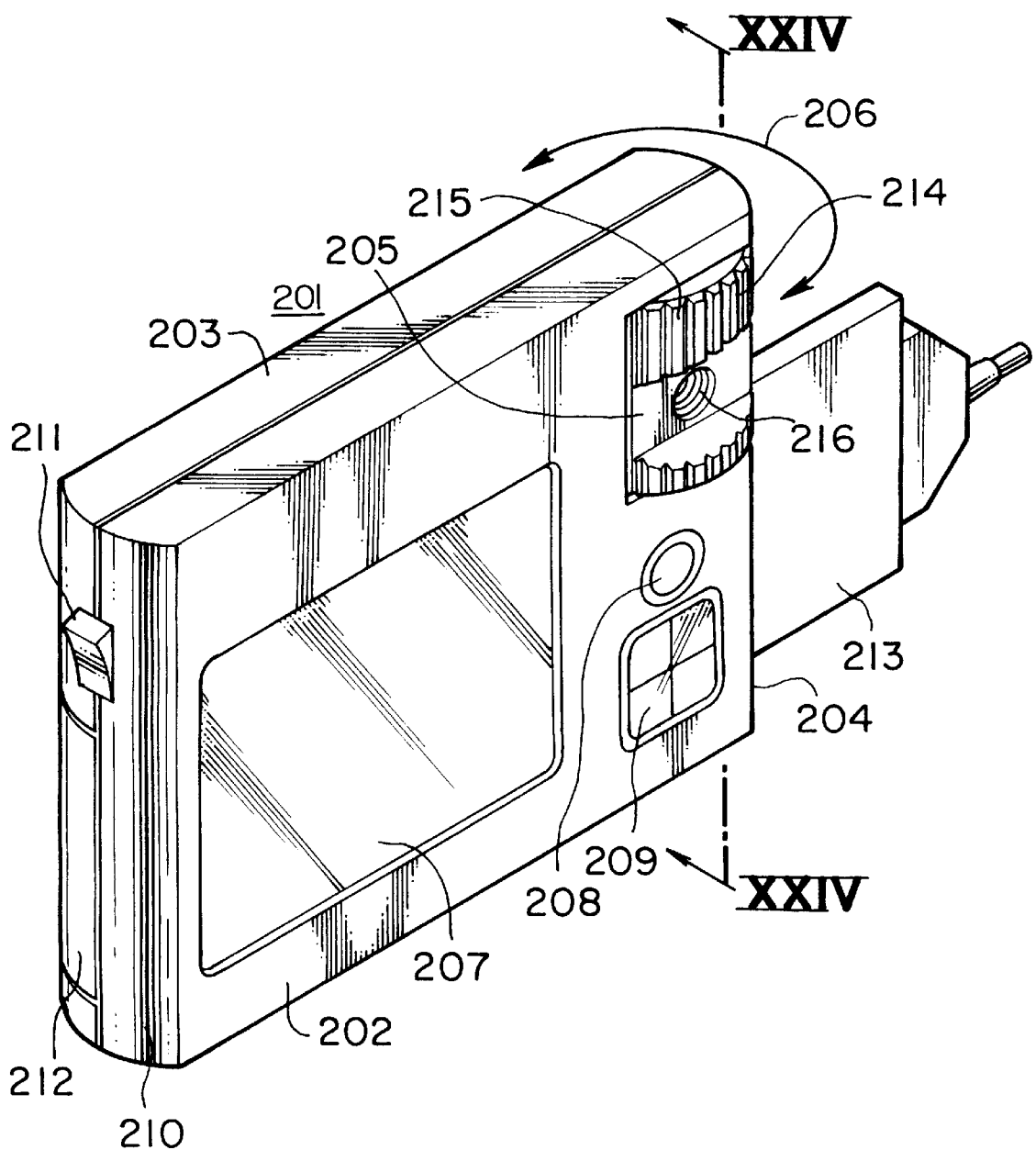
FIG. 23 is a perspective view showing an outer appearance of an imager apparatus according to a fourth embodiment of the present invention, viewed from the front side thereof.
Figure 24:
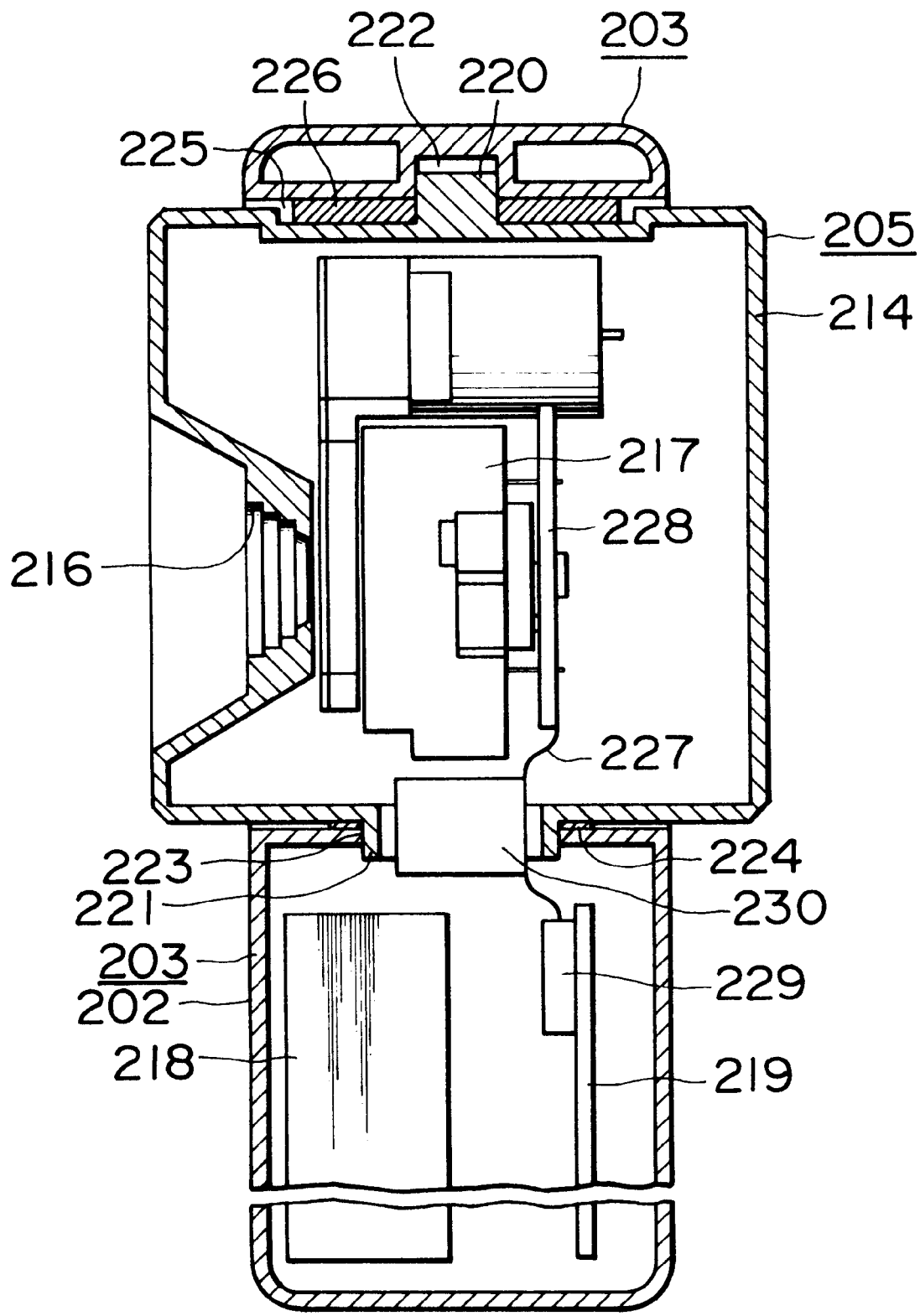
FIG. 24 is a cross-sectional view taken along a line E—E in FIG. 17.

FIGS. 23 and 24 shows a fourth embodiment of the present invention. FIG. 23 shows a perspective view of an imager apparatus 201 including a front panel 202. The imager apparatus 201 has a video camera unit 205 pivoted on an upper right edge portion 204 of a housing 203 for rotation about an axis parallel to the right edge 204, i.e., in rotating directions indicated by arrows 206. A liquid crystal display 207 is accommodated in the housing 203, and a selection button 208 and a cursor key 209 are disposed on the front panel 202 of the housing 203. Also, a power supply switch 211 and a buttery cover 212 are disposed on a left side surface of the housing 203. Further, a card slot (see FIG. 2) is formed in a right side surface 204 of the housing 203 for inserting a PCMCIA card 213. In the video camera unit 205, a knurl 215 is engraved on the surface of a camera case 214 for preventing slippage, and an imaging hole 216 is formed through the camera case 214. FIG. 23 shows a state in which the imaging hole 216 of the video camera unit 205 faces the same direction as the front panel 202 does in order to display the user or a subject existing in front of the front panel 202 on the screen of the liquid crystal display 207. Since the video camera unit 205 is rotatably pivoted on the upper right edge portion 204 of the housing 203, the user can support the housing 203 with the right hand, hold the liquid crystal display 207 at an angle which facilitates viewing, and rotate the video camera unit 205 with the thumb or index finger of the right hand to freely set an imaging angle for the video camera unit 205.

FIG. 24 is a cross-sectional view taken along a line E—E in FIG. 23. A video camera 217 is accommodated in the camera case 214. A liquid crystal panel 218 and a circuit board 219 are disposed in the housing 203. The camera case 214 has a shaft 220 in an upper portion and a cylinder 221 in a lower portion. The shaft 220 is inserted into a recess 222 formed in the housing 203, while the cylinder 221 is inserted into a hole 223 formed in the housing 203, such that the video camera unit 205 is rotatably supported by the shaft 220 and the cylinder 221. A spacer 224 is fitted on the cylinder 221 for ensuring smooth rotation of the camera case 214 relative to the housing 203. A recess 225 is formed around the shaft 220 in which a friction mechanism 226 is placed for serving as a smooth free stop mechanism for applying an adequate friction force to the camera case 214, such that the video camera unit is smoothly stopped relative to the housing 203. The structure of the friction mechanism 226 is identical to that described above in connection with the first embodiment in FIG. 8 or 9. A flexible board 227 passes through the cylinder 227. The flexible board 227 has one end electrically connected to a camera board 228 by soldering and the other end electrically connected to a connector 229 on the circuit board 219. The flexible board 227 includes a coil-like portion 230 for preventing the flexible board 227 from being twisted off when the video camera unit 205 is rotated relative to the housing 203.

Also, if the video camera unit 205 is rotatably positioned on a side edge portion 204 just beside the liquid crystal display 207 (i.e., at an intermediate position between the position of the video camera 5 in the first embodiment and the position of the video camera 5 in the second embodiment), parallax can be most reduced when the user himself is displayed on the liquid crystal display 207.

In this embodiment, since the video camera unit 205 is rotated in the horizontal direction, the video camera 217 will not be turned over even when the video camera unit 205 is rotated to locate the imaging hole 216 on the front panel 202 side or on the rear panel 231 side. Therefore, this embodiment does not require the image turn-over means which has been shown in the first–third embodiments. However, it is occasionally desirable to produce a mirror image only for an image displayed on the monitor unit by horizontally inverting the displayed image (except for images to be recorded by the video recording unit 119). The user is left to determine whether a real image or a mirror image should be displayed on the monitor unit. In this embodiment, a "real image/mirror image" selection button (not shown) may be provided on the surface of the housing in order for the user to depress this button to select a real image or a mirror image.

Figure 25:
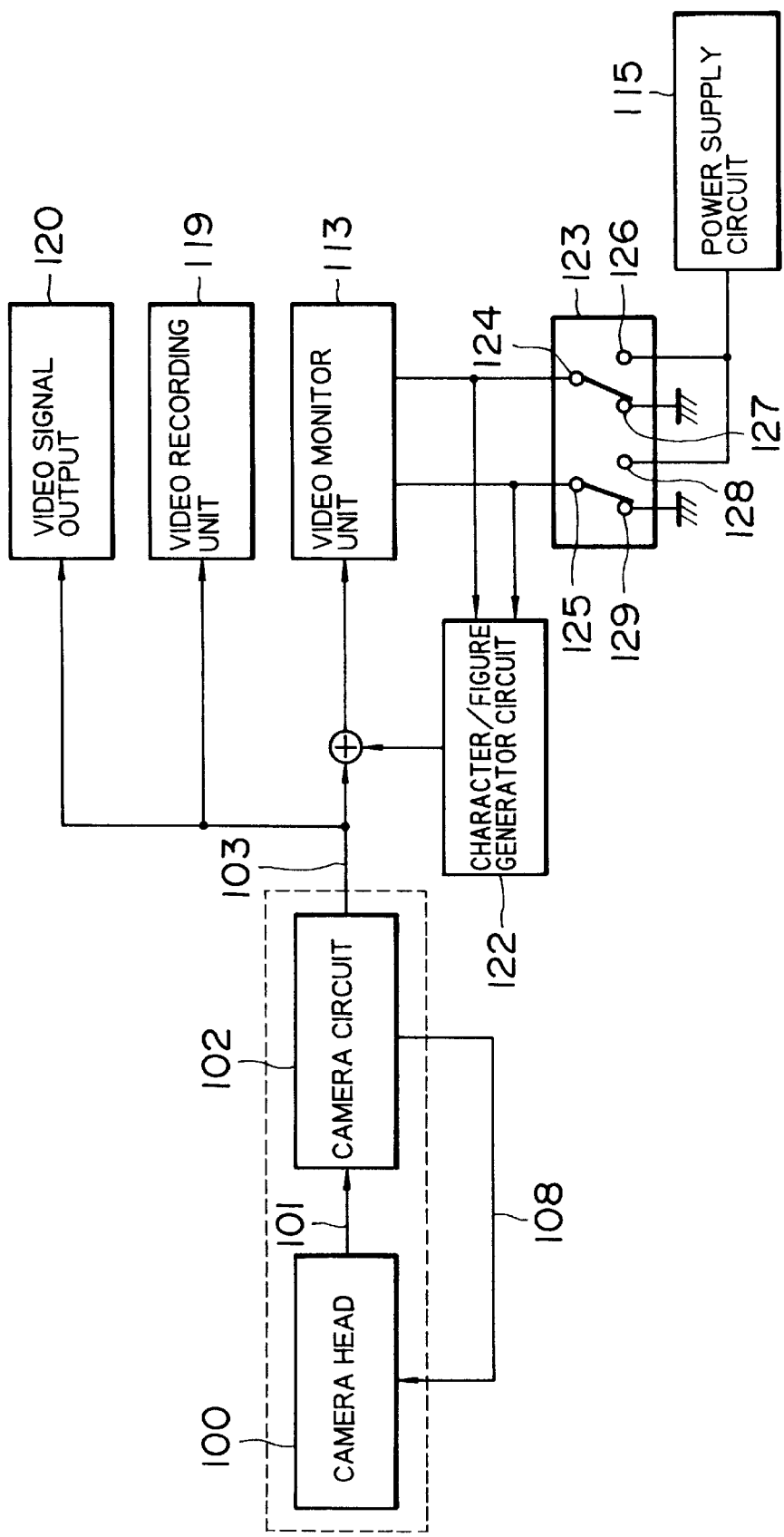
FIG. 25 shows a circuit block diagram of the fourth embodiment of the present invention.

FIG. 25 shows a block diagram of a circuit for converting a real image displayed on the monitor unit to a mirror image. An opto-electrically converted signal 101 is produced by a camera head 100 including a light receiving lens, a solid-state imager device, a circuit for driving the solid-state imager device, and so on, and inputted to a camera circuit 102. The camera circuit 102, including a camera signal processing circuit, a synchronization signal generator circuit, and so on, generates a video signal 103 in a television signal format from the opto-electrically converted signal 101. The camera head 100 and the camera circuit 102 surrounded by dotted rectangles constitute the video camera of the present invention. The video signal 103 is inputted to a video monitor unit 113 and simultaneously to a video recording unit 119 directly. A switch unit 123 is connected to the video monitor unit 113 and a character/figure generator circuit 122. The switch unit 123 includes a switch means 124 for switching the direction of horizontal scanning to horizontally invert an image, and a switch means 125 for switching the direction of vertical scanning to turn over an image in the two series of horizontal and vertical shift registers disposed in the video monitor unit 113. The switch means 124, when connected to a terminal 126 of a power supply 115, inverts the horizontal scanning to generate a mirror image, and simultaneously has the character/figure generator circuit 122 generate a mirrored character or figure which is displayed on the video monitor unit 113. On the other hand, when the switch means 124 is connected to a ground terminal 127, the switch unit 123 is powered off, so that the horizontal shift register of the video monitor unit 113 performs normal scanning, and the character/figure generator circuit 122 generates a normal character or figure which is displayed on the video monitor unit 113. (The switch means 125, when connected to a terminal 128 of the power supply 115, inverts the vertical scanning to produce an upside-down image, and simultaneously an upside-down character or figure is generated from the character/figure generator circuit 122 to be displayed on the video monitor unit 113. On the other hand, when the switch means 125 is connected to a ground terminal 129, the switch unit 123 is powered off, so that the vertical shift register of the video monitor unit 113 performs normal scanning, and the character/figure generator circuit 122 generates a normal character or figure which is displayed on the video monitor unit 113.)

By now, it will be appreciated that the present invention has the following effects.

First, since the image arrangement convertor circuit composed of a random access memory (RAM), a write address generator circuit, and a read address generator circuit is inserted between the video camera and the video display unit or the video recording unit, an upright image can be easily produced without rotating the housing. Stated another way, since the signal processing is performed depending on an angular position of the video camera, even if a video signal representing an upside-down image is inputted, the image arrangement convertor circuit automatically acts to convert the upside-down image to an upright image, thus making it possible to prevent such upside-down images from being erroneously recorded by a recording apparatus such as a VTR.

Second, since a vertically asymmetric character or figure is usually displayed on the monitor, it can be determined from the displayed character or figure whether an image is being taken in a normal (upright) state or in an abnormal (upside-down) state. Specifically, when the monitor is turned by 180 without moving the video camera to be directed to the same direction as the video camera faces, the vertical scanning direction of the monitor is reversed, so that an upright image and an upright character or figure are displayed on the monitor. It is also understood that the upright image is being recorded by a recording apparatus. However, on the other hand, if the video camera is turned by 180 based on the position of the monitor to be directed to the same direction as the monitor faces, an upside-down video signal from the video camera is superimposed with an upright character or figure signal from the character/figure generator circuit. Then, the vertical scanning direction is reversed in the monitor, with the result that an upright image and an upside-down character or figure are displayed on the monitor. In this case, since the displayed character or figure is upside down even if the upright image is being displayed, it is easily determined that the image is being taken in an abnormal state. In this way, an abnormal imaging state can be identified from the upside-down character or image displayed on the monitor, and accordingly it is recognized that the video camera must be returned to its original position and the monitor be rotated by 180°.

Third, a laterally asymmetric character or figure is usually displayed on the monitor. Thus, when the horizontal scanning direction of the monitor is reversed to produce a mirror image, the displayed laterally asymmetric character of figure is also mirrored. Therefore, it can be easily recognized from the mirrored character or figure that the displayed image is a mirrored image.

Fourth, since the video camera unit is made compact and pivoted for rotation about an axis parallel to an edge of the housing, a less strength is required for joining members to join the video camera with the housing. Therefore, the joining members can be reduced in size and weight.

Fifth, with the video camera being pivoted on the housing for rotation in the horizontal direction, even if the video camera is directed to the user side, i.e., to the same direction as the monitor faces (because the video camera is horizontally rotated about an axis extending in the vertical direction to face to the monitor side), upside-down images will not be displayed or recorded, but upright images are always displayed or recorded. This eliminates a vertical inversion circuit which would be required when the video camera is rotated about a horizontal axis.

Sixth, the video camera is pivoted on an edge of the housing for rotation about an axis parallel to the edge, and knurl is engraved on the surface of a camera case, so that the user can easily rotate the video camera unit with his thumb, index finger, or the like.

Seventh, since the imaging hole can be covered with the housing by rotating the video camera unit, a so-called lens protector is not required. Also, since the video camera unit is not in use when the imaging hole is covered with the housing, the mechanism for rotating the video camera unit may also serve as a power supply switch or a mode switch. Therefore, a series of operations from imaging to reproduction of images can be carried out only by a single action of rotating the video camera unit.

Eighth, the video camera is positioned on an upper edge portion or a side edge portion of the housing corresponding to substantially the center of the monitor. Therefore, when the user himself is to be imaged by the video camera directed to himself, the user can be displayed in a central portion of the monitor with minimally reduced parallax.

We claim:

1. An imager apparatus comprising:
   (a) a video camera including:
      (1) a lens;
      (2) a camera head for opto-electrically converting light focused by said lens to an opto-electrically converted signal; and
      (3) a camera circuit for generating a video signal from said opto-electrically converted signal; and
   (b) a housing for pivoting said video camera for rotation about a horizontal axis, including:
      (1) a power supply circuit;
      (2) an image arrangement convertor circuit having a random access memory for temporarily storing a video signal from said camera circuit, a write address generator circuit for generating write addresses for said random access memory, and a read address generator circuit for generating read addresses for said random access memory; and
      (3) signal switching means for controlling the operation of said image arrangement convertor circuit in accordance with a rotating angular position of said video camera relative to said housing to switch whether said read address generator circuit is forced to generate read addresses in the same order as or in the order reverse to the order in which said write address generator has generated write addresses.

2. An imager apparatus according to claim 1, further comprising a monitor disposed in said housing for displaying video signals outputted from said image arrangement convertor circuit.

3. An imager apparatus according to claim 1, further comprising a recorder disposed in said housing for recording video signals outputted from said image arrangement convertor circuit.

4. An imager apparatus according to claim 2, further comprising a character/figure generator circuit, disposed between said video camera and said monitor, including a read address generator circuit for changing the direction of read scanning in accordance with said signal switching means, and a read only memory for storing character information, wherein said character/figure generator circuit generates a character or figure which is identifiable if said character or figure is turned over or turned around laterally, and said character or figure is displayed on said monitor.

5. An imager apparatus comprising:
(a) a video camera including:
  (1) a lens;
  (2) a camera head for opto-electrically converting light focused by said lens to an opto-electrically converted signal; and
  (3) a camera circuit for generating a video signal from said opto-electrically converted signal; and
(b) a housing for pivoting said video camera for rotation about a horizontal axis, including:
  (1) a power supply circuit;
  (2) an image arrangement convertor circuit having a random access memory for temporarily storing a video signal from said camera circuit, a write address generator circuit for generating write addresses for said random access memory, and a read address generator circuit for generating read addresses for said random access memory in the order reverse to the order in which said write address generator circuit has generated the write addresses;
  (3) a monitor unit for outputting said video signal outputted from said image arrangement converter circuit; and
  (4) signal switching means for controlling the operation of said image arrangement convertor circuit in accordance with a rotating angular position of said video camera relative to said housing to switch between a case where said camera circuit is directly connected with the monitor unit and a case where said camera circuit is connected with said monitor unit through said image arrangement convertor circuit intervening therebetween.

6. An imager apparatus comprising:
(a) a video camera including:
  (1) a lens;
  (2) a camera head for opto-electrically converting light focused by said lens to an opto-electrically converted signal; and
  (3) a camera circuit for generating a video signal from said opto-electrically converted signal; and
(b) a housing for pivoting said video camera for rotation about a horizontal axis, including:
  (1) a power supply circuit;
  (2) an image arrangement convertor circuit having a random access memory for temporarily storing a video signal from said camera circuit, a write address generator circuit for generating write addresses for said random access memory, and a read address generator circuit for generating read addresses for said random access memory in the order reverse to the order in which said write address generator circuit has generated the write addresses;
  (3) a recorder for recording said video signal outputted from said image arrangement converter circuit; and
  (4) signal switching means for controlling the operation of said image arrangement convertor circuit in accordance with a rotating angular position of said video camera relative to said housing to switch between a case where said camera circuit is directly connected with said recorder and a case where said camera circuit is connected with said recorder through said image arrangement converter circuit intervening therebetween.

7. An imager apparatus according to claim 5, wherein said signal switching means disconnects said image arrangement convertor circuit from said power supply circuit.

8. An imager apparatus according to claim 6, wherein said signal switching means disconnects said image arrangement convertor circuit from said power supply circuit.

9. An imager apparatus according to claim 5, further comprising a character/figure generator circuit, disposed between said video camera and said monitor unit, including a read address generator circuit for changing the direction of read scanning in accordance with said signal switching means, and a read only memory for storing character information, wherein said character/figure generator circuit generates a character or figure which is identifiable if said character or figure is turned over or turned around laterally, and said character or figure is displayed on said monitor unit.

10. An imager apparatus further comprising:
(a) a housing including:
  (1) a monitor unit; and
(b) a video camera pivoted for rotation about a vertical rotating axis of said housing unitarily determined by said monitor unit, including:
  (1) a lens;
  (2) a camera head for opto-electrically converting light focused by said lens to generate an opto-electrically converted signal;
  (3) a camera circuit for generating a video signal from said opto-electrically converted signal; and
signal switching means disposed in said housing for performing a signal switching operation corresponding to a rotating angular position of said video camera relative to said housing; and
horizontal scanning means disposed in said monitor unit for inverting the horizontal scanning direction,
wherein said signal switching means switches said horizontal scanning means.

11. An imager apparatus comprising:
(a) a housing including:
  (1) a monitor unit; and
(b) a video camera pivoted for rotation about a vertical rotating axis of said housing unitarily determined by said monitor unit, including:
  (1) a lens;
  (2) a camera head for opto-electrically converting light focused by said lens to generate an opto-electrically converted signal;
  (3) a camera circuit for generating a video signal from said opto-electrically converted signal; and
further comprising a character/figure generator circuit, disposed between said video camera and said monitor, including a read address generator circuit for changing the direction of read scanning in accordance with a signal switching means, and a read only memory for storing character information, wherein said character/figure generator circuit generates a character of figure which is identifiable if said character or figure is turned over or turned around laterally, and said character or figure is displayed on said monitor unit.

12. An imager apparatus comprising:
(a) a substantially rectangular housing including:
  (1) a monitor unit; and
(b) a video camera positioned on an edge portion of said housing for rotation about an axis parallel to said edge portion, including:
  (1) a lens;
  (2) a camera head for opto-electrically converting light focused by said lens to generate an opto-electrically converted signal; and
  (3) a camera circuit for generating a video signal from said opto-electrically converted signal,
  wherein said video camera is rotated such that said lens faces a plane of said housing so that said plane conceals and protects said lens.

13. An imager apparatus as claimed in claim 12, further comprising a recorder disposed in said housing which records video signals outputted from said camera circuit.

14. An imager apparatus according to claim 12, wherein said edge portion is an upper edge portion.

15. An imager apparatus according to claim 12, wherein said edge portion is a side edge portion.

16. A imager apparatus comprising:
(a) a video camera including:
  (1) a lens;
  (2) a camera head for opto-electrically converting light focused by said lens to an opto-electrically converted signal; and
  (3) a camera circuit for generating a video signal from said opto-electrically converted signal; and
(b) a housing for pivoting said video camera for rotation about a predetermined axis, including:
  (1) a power supply circuit;
  (2) an image arrangement convertor circuit having a random access memory for temporarily storing a video signal from said camera circuit, a write address generator circuit for generating write addresses for said random access memory, and a read address generator circuit for generating read addresses for said random access memory; and
  (3) signal switching means for controlling the operation of said image arrangement convertor circuit in accordance with a rotating angular position of said video camera relative to said housing to switch whether said read address generator circuit is forced to generate read addresses in the same order as or in the order reverse to the order in which said write address generator has generated write addresses.

17. A imager apparatus comprising:
(a) a video camera including:
  (1) a lens;
  (2) a camera head which opto-electrically converts light focused by said lens to an opto-electrically converted signal; and
  (3) a camera circuit which generates a video signal from said opto-electrically converted signal; and
(b) a housing which pivots said video camera for rotation about a horizontal axis, including:
  (1) a power supply circuit;
  (2) an image arrangement convertor circuit having a random access memory for temporarily storing a video signal from said camera circuit, a write address generator circuit which generates write addresses for said random access memory, and a read address generator circuit which generates read addresses for said random access memory; and
  (3) switching circuit which controls the operation of said image arrangement convertor circuit in accordance with a rotating angular position of said video camera relative to said housing to switch whether said read address generator circuit is forced to generate read addresses in the same order as or in the order reverse to the order in which said write address generator has generated write addresses.

18. An imager apparatus according to claim 17, further comprising a monitor disposed in said housing which displays video signals outputted from said image arrangement convertor circuit.

19. An imager apparatus according to claim 17, further comprising a recorder disposed in said housing which records video signals outputted from said image arrangement convertor circuit.

20. An imager apparatus according to claim 18, further comprising a character/figure generator circuit, disposed between said video camera and said monitor, including a read address generator circuit which changes the direction of read scanning in accordance with said switching circuit, and a read only memory for storing character information, wherein said character/figure generator circuit generates a character or figure which is identifiable if said character or figure is turned over or turned around laterally, and said character or figure is displayed on said monitor.

21. A imager apparatus comprising:
(a) a video camera including:
  (1) a lens;
  (2) a camera head which opto-electrically converts light focused by said lens to an opto-electrically converted signal; and
  (3) a camera circuit which generates a video signal from said opto-electrically converted signal; and
(b) a housing which pivots said video camera for rotation about a horizontal axis, including:
  (1) a power supply circuit;
  (2) an image arrangement convertor circuit having a random access memory for temporarily storing a video signal from said camera circuit, a write address generator circuit which generates write addresses for said random access memory, and a read address generator circuit which generates read addresses for said random access memory in the order reverse to the order in which said write address generator circuit has generated the write addresses;
  (3) a monitor unit for outputting said video signal outputted from said image arrangement converter circuit; and
  (4) switching circuit which controls the operation of said image arrangement convertor circuit in accordance with a rotating angular position of said video camera relative to said housing to switch between a case where said camera circuit is directly connected with the monitor unit and a case where said camera circuit is connected with said monitor unit through said image arrangement convertor circuit intervening therebetween.

22. An imager apparatus according to claim 21, wherein said switching circuit disconnects said image arrangement convertor circuit from said power supply circuit.

23. An imager apparatus according to claim 21, further comprising a character/figure generator circuit, disposed between said video camera and said monitor unit, including a read address generator circuit for changing the direction of read scanning in accordance with said signal switching means, and a read only memory for storing character information, wherein said character/figure generator circuit generates a character or figure which is identifiable if said character or figure is turned over or turned around laterally, and said character or figure is displayed on said monitor unit.

24. A imager apparatus comprising:
 (a) a video camera including:
  (1) a lens;
  (2) a camera head which opto-electrically converts light focused by said lens to an opto-electrically converted signal; and
  (3) a camera circuit which generates a video signal from said opto-electrically converted signal; and
 (b) a housing which pivots said video camera for rotation about a horizontal axis, including:
  (1) a power supply circuit;
  (2) an image arrangement convertor circuit having a random access memory for temporarily storing a video signal from said camera circuit, a write address generator circuit which generates write addresses for said random access memory, and a read address generator circuit which generates read addresses for said random access memory in the order reverse to the order in which said write address generator circuit has generated the write addresses;
  (3) a recorder which records said video signal outputted from said image arrangement converter circuit; and
  (4) switching circuit which controls the operation of said image arrangement convertor circuit in accordance with a rotating angular position of said video camera relative to said housing to switch between a case where said camera circuit is directly connected with said recorder and a case where said camera circuit is connected with said recorder through said image arrangement converter circuit intervening therebetween.

25. An imager apparatus according to claim 24, wherein said switching circuit disconnects said image arrangement convertor circuit from said power supply circuit.

26. An imager apparatus comprising:
 (a) a video camera including:
  (1) a lens;
  (2) a camera head for opto-electrically converting light focused by said lens to an opto-electrically converted signal; and
  (3) a camera circuit which generates a video signal from said opto-electrically converted signal; and
 (b) a housing which pivots said video camera for rotation about a predetermined axis, including;
  (1) a power supply circuit;
  (2) an image arrangement convertor circuit having a random access memory for temporarily storing a video signal from said camera circuit, a write address generator circuit for generating write addresses for said random access memory, and a read address generator circuit for generating read addresses for said random access memory; and
  (3) switching circuit which controls the operation of said image arrangement convertor circuit in accordance with a rotating angular position of said video camera relative to said housing to switch whether said read address generator circuit is forced to generate read addresses in the same order as or in the order reverse to the order in which said write address generator has generated write addresses.

* * * * *